United States Patent
Rochford et al.

(10) Patent No.: US 6,633,312 B1
(45) Date of Patent: Oct. 14, 2003

(54) METHOD AND APPARATUS FOR SELECTING NETWORK ENTITIES

(75) Inventors: Suzanne L. Rochford, Hull (CA); Allan Wille, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/420,424

(22) Filed: Oct. 19, 1999

(51) Int. Cl.[7] .................................................. G09G 5/00
(52) U.S. Cl. ........................ 345/736; 345/738; 709/223
(58) Field of Search .................................. 345/733–739, 345/744, 764, 765, 810, 821–823, 835, 853, 854, 969; 709/220, 223, 224; 707/1, 3, 7, 10, 100, 104.1

(56) References Cited

U.S. PATENT DOCUMENTS

| | | | | |
|---|---|---|---|---|
| 5,136,690 A | * | 8/1992 | Becker et al. | 345/619 |
| 5,201,047 A | * | 4/1993 | Maki et al. | 707/4 |
| 5,295,244 A | * | 3/1994 | Dev et al. | 345/775 |
| 5,544,360 A | * | 8/1996 | Lewak et al. | 707/1 |
| 5,874,964 A | | 2/1999 | Gille | |
| 5,910,803 A | * | 6/1999 | Grau et al. | 345/734 |
| 5,958,012 A | * | 9/1999 | Battat et al. | 345/969 |
| 5,960,439 A | | 9/1999 | Hamner et al. | |
| 6,054,987 A | * | 4/2000 | Richardson | 345/440 |
| 6,175,363 B1 | * | 1/2001 | Williams et al. | 345/738 |
| 6,195,095 B1 | * | 2/2001 | Beer et al. | 345/839 |

FOREIGN PATENT DOCUMENTS

| | | | |
|---|---|---|---|
| WO | 9915950 | 9/1997 | G06F/3/00 |

OTHER PUBLICATIONS

Balasubramanian, V.; Turoff, Murray; A Systematic Approach to User Interface Design for Hypertext Systems; IEEE, 1995; pp 241–250.

Bay Networks, Inc., Apr. 1998, "Using Optivity Network Management System 8.1 Internetwork Applications", Chapters 3 and 4.

"Telecom Operations Map", Telemanagement Forum, Evaluation Version 1.1, Apr. 1999, pp. iii to xxii and 1 to 49.

* cited by examiner

Primary Examiner—Sy D. Luu

(57) ABSTRACT

Network management can be made more efficient by using a graphical user interface that is clear and concise in what network information is identified and subsequently displayed. One key to improving graphical user interfaces is the categorizing of network entities into a series of attribute layers that define different features of the network entities. For instance, a layer of attributes may include geographical regions, services, customers, or types of network entities. By selecting a base view from the group of geographical regions and then network features for filtering operations from one or more of the other attribute layers, the network entities defined by the selected network features can be identified and isolated with all other irrelevant network entities being filtered out. The advantages to this graphical user interface is especially evident when considering the case that a specific customer, service, or network entity requires special attention. Other features of this interface include book marking, archiving, and monitoring specific views of a network based off a base view along with one or more filtered network features.

37 Claims, 19 Drawing Sheets

METHOD AND APPARATUS FOR SELECTING NETWORK ENTITIES

FIELD OF THE INVENTION

This invention relates generally to graphical user interfaces and more specifically to graphical user interfaces used for selecting network entities and/or managing a network.

BACKGROUND OF THE INVENTION

Communication networks are progressively becoming more complicated. Along with more network entities being added overall, numerous other changes have resulted in increasingly complex networks being established.

For one, new services have been added that fall within a number of different categories including network, link, data transfer, and application services. These service categories are subdivided into numerous different services that utilize a variety of different types of network entities. For example, network services can include Wide Area Network Services (WAINS), Local Area Network Services (PLANS), Metropolitan Area Network Services (MANS), and Virtual Private Network Services (VANS) while application services can include email, http, or ftp, among others.

Also within current networks, a considerable number of different customers with a variety of requirements are being integrated within central networks. Some of these customers include educational, financial, government, and health care institutions which vary in what type and level of services are needed, as well as the bandwidth and complexity necessary.

Further complexity within today's networks results simply from the large number of different network elements, transport standards, and interconnection possibilities utilized. For instance, possible transport standards include SONET, Asynchronous Transfer Mode (ATM), and Internet Protocol (IP) while interconnections using these standards could be made with a variety of different fiber optic cables such as OC-12, OC-48, OC-192, and OC-3X, as well as copper wire and microwaves.

The overall effect of these numerous different services, customers, and network entities within any one network is to make the network considerably more difficult to manage compared to previously established networks with simpler architectures. This difficulty with managing such a complex network results from the inability for those managing the network, hereinafter referred to as network managers, to observe all the relevant network information in a clear and concise manner.

One attempt at mitigating this problem has been to isolate the area of interest by allowing the network manager to select a geographical location for display. With this selection, only the network components within the specified area are shown to the network manager. Although this reduces the irrelevant information being shown to the network manager, the isolation is not sufficient in order to clearly display information relating to a single customer, service, and/or type of network entity when considering a network with large complexity.

SUMMARY OF THE INVENTION

The present invention can allow network managers to view network entities of interest more easily by only displaying a subset of network entities as defined by network features selected by the network managers. To this end, the present invention, according to one broad aspect, is a method of selecting a focused subset of network entities such that the network entities of interest are separated from other network entities within a larger set. This method of selecting network entities starts with a categorization being provided for each of a series of network entities within a network. This categorization has each network entity corresponding to one or more of a plurality of network features arranged within attribute layers which are each defined by a respective containment hierarchy of network features. Secondly, the method includes the step of receiving as focused network features one or more selected network features for one or more of the attribute layers. Finally, the focused subset of network entities of interest are selected by identifying which network entities are categorized with all of the focused network features.

Preferably, the network entities within the focused subset are displayed with all other network entities not being displayed. As well, the method preferably is able to highlight one or more of the network entities within the subset of network entities of interest. Yet further, the displaying of the relevant network entities is preferably done by illustrating a geographical region selected for a base view and further illustrating a plurality of network entities within the geographical region based upon a series of network features selected during filtering operation(s). In other embodiments, the displaying of the network entities is done with a logical view or a text list view.

Further features of the method according to the preferred embodiment include bookmarking, archiving, and monitoring features for sets of selected network features.

Additionally, further embodiments of the present invention provide a computer system or a graphical user interface that is adapted to implement one of the above described methods. Yet a further embodiment provides a computer readable medium having software stored thereon for instructing a computer to implement one of the above described methods.

Yet further, the present invention, according to other aspects, is a memory for storing a containment hierarchy, a graphical user interface for selecting network features, and a memory for storing information regarding network entities.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the present invention are described with reference to the following figures, in which.

DETAILED DESCRIPTION OF THE PREFERRED EMBODIMENTS

Figure 1:
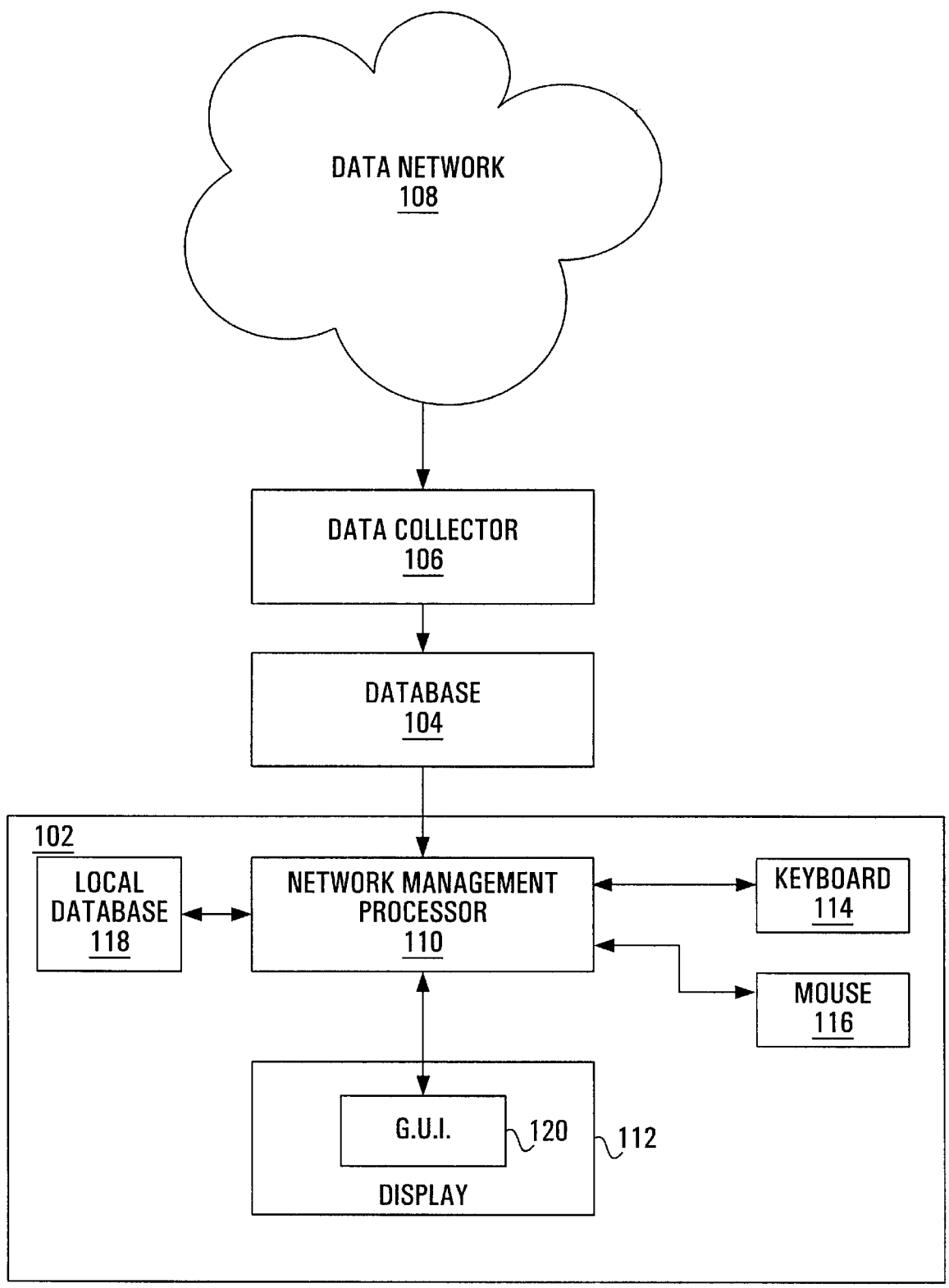
FIG. 1 is a block diagram of a network coupled to a network management device featuring a graphical user interface according to a preferred embodiment of the present invention.

A method and apparatus is disclosed herein below for navigating within a Graphical User Interface (GUI) such that a subset of a plurality of network entities is selected. Preferably, the GUI further displays the network entities of the subset so that a user of the GUI can more easily observe and/or manage a complex network. The GUI preferably allows the user to select a plurality of different criteria to limit the number of network entities that are selected and displayed, hence allowing only the network entities of interest to be shown. These criteria for filtering and the process of performing this filtering will be described in detail herein below. Prior to the detailed description of the present invention, a few definitions will be given to define terms used throughout the document.

DEFINITIONS

NETWORK ENTITY: a component within a network, for example a node.

NETWORK FEATURE: a limiting characteristic, for example a specific customer type such as a bank, that has one or more network entities of a network associated with it.

ATTRIBUTE LAYER: a category of network features, for example all network features related to customers. Preferably, each attribute layer for a network has an associated containment hierarchy of network features. Preferably and for the purpose of the description which follows, there are four attribute layers, one for all network features relating to customers, one for all network features relating to a particular type of network entity, one for all network features relating to different services, and one for all network features relating to different geographical regions. For example, a network feature, such as "BANK CUSTOMERS", contained within the customer attribute layer may be contained in a higher level network feature, such as "FINANCIAL CUSTOMERS", and possibly may contain a plurality of lower level network features, such as specific customers. Each of the network entities within a network is preferably associated with a network feature in each of the attribute layers of a network, and more generally with a "direct containment hierarchy" of network features in each of the attribute layers.

LAYER CAKE: a user selected group of one or more network features that are contained within one or more different attribute layers and which collectively define the group of network entities of interest. A layer cake consists of a "layered" selection of network features, starting with a first layer referred to as a base view selection which consists of one or more network features that are selected to be the fundamental network feature(s) for a layer cake. No network entities outside the scope of the base view will be included in the group defined by the layer cake. Preferably, one of the attribute layers is a hierarchy of geographical region network features, with the base view being defined by a selected geographical region network feature, though this is not meant to limit the scope of the present invention. One or more additional layers may further define the layer cake. These additional layers maybe a "filter selection" and/or a "highlight selection". The filter selection further limits the group of network entities of interest, while the highlight selection defines a subset of the base view (and filter selection when present) which is to be visually distinguished when the group of network entities of interest is displayed by the GUI.

PARENT: a network feature which contains other network features within one of the above defined containment hierarchies. For example, the geographical region of "CENTRAL ONTARIO" is a parent to the region of "TORONTO".

CHILD,CHILDREN: network features contained within a parent network feature. It should be understood that a network entity that is associated with a child network feature is inherently associated with the parent network feature, as well as any other directly superior network features. For example, a network entity associated with "TORONTO" would also inherently be associated with "CENTRAL ONTARIO", "ONTARIO" and "CANADA".

SIBLINGS: the network feature children of a common parent. For example, "TORONTO" and "BARRIE" can be considered siblings when considering the parent of "CENTRAL ONTARIO".

DIRECT CONTAINMENT HIERARCHY: is a list of network features that ranges from a child's direct parent through the parent's parent up to a top-level network feature. For example, the direct containment hierarchy for "TORONTO" might be "CENTRAL ONTARIO", "ONTARIO", "CANADA", "NORTH AMERICA", and "WORLD" with "CENTRAL ONTARIO" being the parent for "TORONTO" and "WORLD" being the top-level network feature.

COMPUTER SYSTEM

An example of a computer system by which embodiments of the present invention may be provided or implemented is depicted in block diagram form in FIG. 1. As shown, a Network Management Device (NMD) 102 is coupled in series with a database 104, a data collector 106 and one or more data networks 108, such as IP networks.

The data collector 106 is preferably capable of collecting status and performance information concerning network entities contained within the data networks 108 through a series of status and performance signals being sent from the network entities to the data collector 106. The possible status signals in one example include a warning flag, a failure notice, another alarm indication, and an "OK" flag. The possible performance signals in one example include signals comprising the particular network entity's error rate and percent utilization. The status and performance signals preferably are stored in the database 104 as status and performance features respectively of the network entities.

The database 104 preferably receives and stores the status and performance information from the data collector 106 and further receives and stores configuration information concerning the network entities within the network 108. The configuration information preferably includes all connections between the network entities within the network 108 such as a particular node with a particular network interconnection. The entry of this configuration information to the database 104 could be made by a central operator at the database 104 or alternatively could be communicated through the data network 108 and the data collector 106 by operators at remote locations such as customer sites. Alternatively, this information may be entered into the database 104 by having network entities directly communicate with the database 106. The key for the present invention is that the database 104 stores a list of the network entities within the network(s) of interest along with configuration information. The method used to generate this database is not directly relevant to the preferred embodiments of the present invention.

The NMD 102 preferably comprises a network management processor 110 which is coupled to a display 112, and to user input devices such as a keyboard 114 and a mouse 116. If the display 112 is touch sensitive, then the display itself provides a user input device.

The NMD 102 according to the preferred embodiment further comprises a local database 118, coupled to the network management processor 110, that receives and stores categorization information corresponding to the network entities within the network(s) of interest. The categorization information preferably consists of a direct containment hierarchy of network features for each of the attribute layers, and an identification of where in each containment hierarchy each network entity is located. In some embodiments, a network entity could be located in more than one location within the containment hierarchy; for example, if a network entity is shared between two different customers.

Preferably the categorization information is manually input to the local database 118 by operators, though similar alternatives to the inputting of configuration information within the database 104 can apply. For instance, this categorization information could be communicated to the local database 118 by operators at remote locations such as customer sites. In the end, the local database 118 preferably maintains a file folder structure for each of the attribute layer containment hierarchies with a particular network entity being included in one or more folders. Alternatively, the local database 118 maintains a list of the network entities within the network(s) of interest along with a list of corresponding network features that are associated with the network entities. The NMD 102 according to the preferred embodiment is adapted to perform two functions. Firstly, it presents a GUI 120 on the display 112 to enable the presentation of attribute layer hierarchies to a user in a coherent manner and to enable the receipt of instructions from the user through the user input devices 114,116. Secondly, the NMD 102 performs processing on data stored in the database 104 and the local database 118 in accordance with instructions received from the user through the GUI 120 in order to put the data into a form suitable for display.

The network 108 is a network of interconnected communication devices permitting communication of data from one point in the network to another. Some examples of networks include Asynchronous Transfer Mode (ATM) networks, the Internet, networks of microwave antenna base stations, satellite networks, and networks comprising a mixture of these technologies. Regardless of the specific type, the network(s) 108 comprise a number of network entities that each have a set of defined network features. For example, an ATM network includes network nodes and interconnections that may be used for a particular customer and/or service. In other networks, a network entity may include such things as routers, antenna base stations, or interconnections that range from copper wire to fiber optic cable to microwave links.

The GUI 120, according to an embodiment of the present invention, that is adapted to implement a method according to the present invention as described later will now be described with reference to FIG. 2A. The GUI 120 depicted in FIG. 2A comprises a header 202, a footer 204, a layer cake selection window 206, a layer cake display area 207, and a network display window 208. As will be seen in examples described herein below, all illustrations of the GUI 120 will comprise a similar header and footer, but may have differences with respect to the contents of the layer cake selection window 206, the layer cake display area 207, and the network display window 208.

The embodiment of the GUI 120 depicted within FIG. 2A features the use of the layer cake selection window 206 to navigate through the attribute layers, to select one or more network features, herein below referred to as focussed network features, to be included within a layer cake. The layer cake thus identifies a group of network entities of interest, referred to herein below as a focussed set of network entities. While this identification per se may be considered the output of the GUI which is useful in its own right, in the preferred embodiment, the group of network entities thus identified is displayed in the network display window 208. In the description which follows, the assumption made is that a display of the group of network entities identified by the layer cake is always to be generated.

Figure 2A:
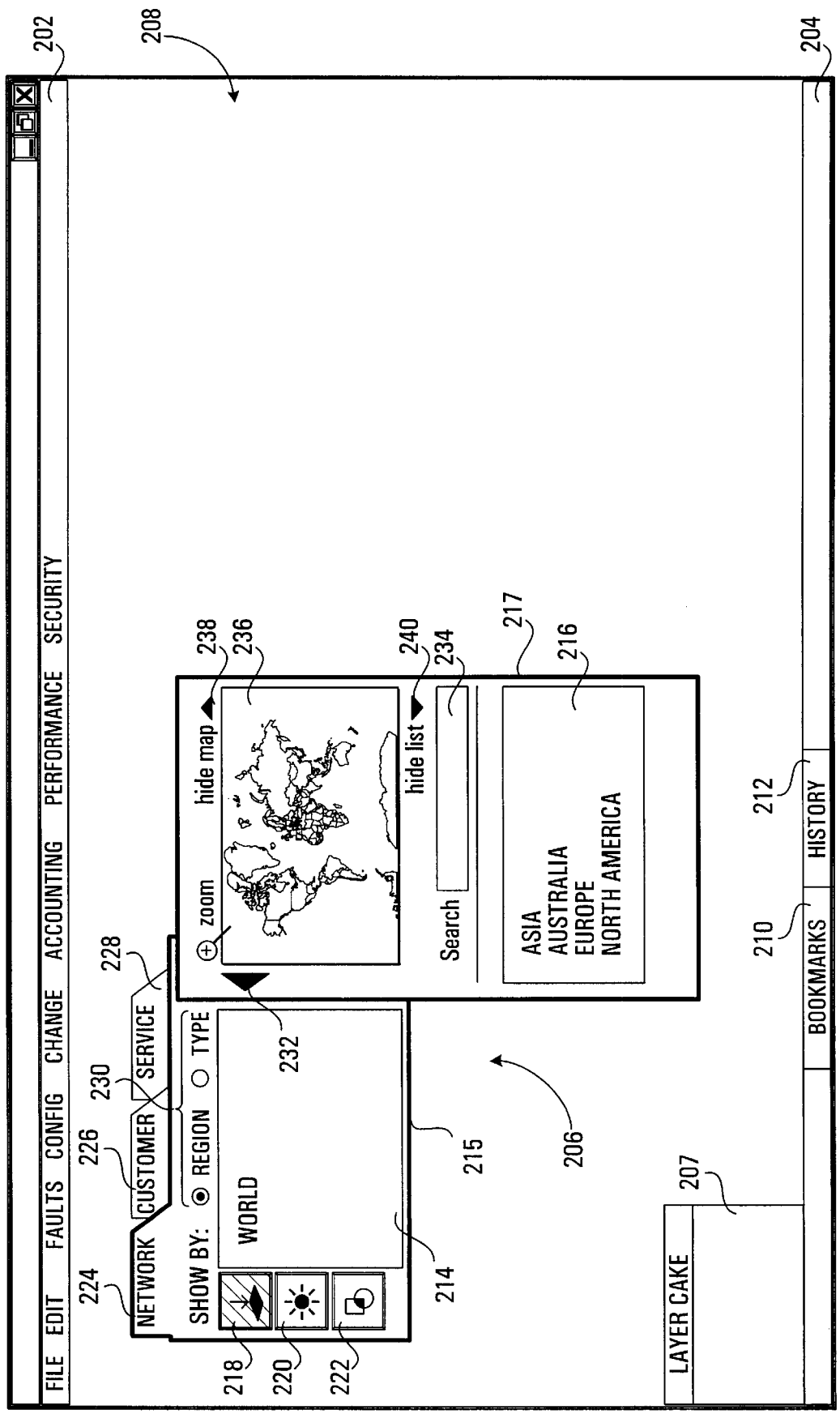
FIGS. 2A and 2B are illustrations of a graphical user interface (GUI) according to a preferred embodiment of the present invention during a selection of a base view.

In the preferred embodiment depicted in FIG. 2A, the layer cake selection window 206 comprises a direct containment hierarchy 214 within a first window 215; a list of contents 216 within a second window 217; base view, highlight, and filter buttons 218,220,222; network, customer, and service attribute layer selection tabs 224,226, 228; and a region/type option 230. The purpose and operation of each of these components, as well as the layer cake display area 207, will be described herein below.

The header 202, within the preferred embodiments, includes menus that are important for network management operations, but will not be described in detail herein since preferably they do not directly relate to the selection of network entities for display. The footer 204 preferably includes a bookmarks menu 210 and a history menu 212 that will be described in detail herein below with reference to FIGS. 7 and 8 respectively.

OVERALL OPERATION OF THE GUI

Figure 9A:
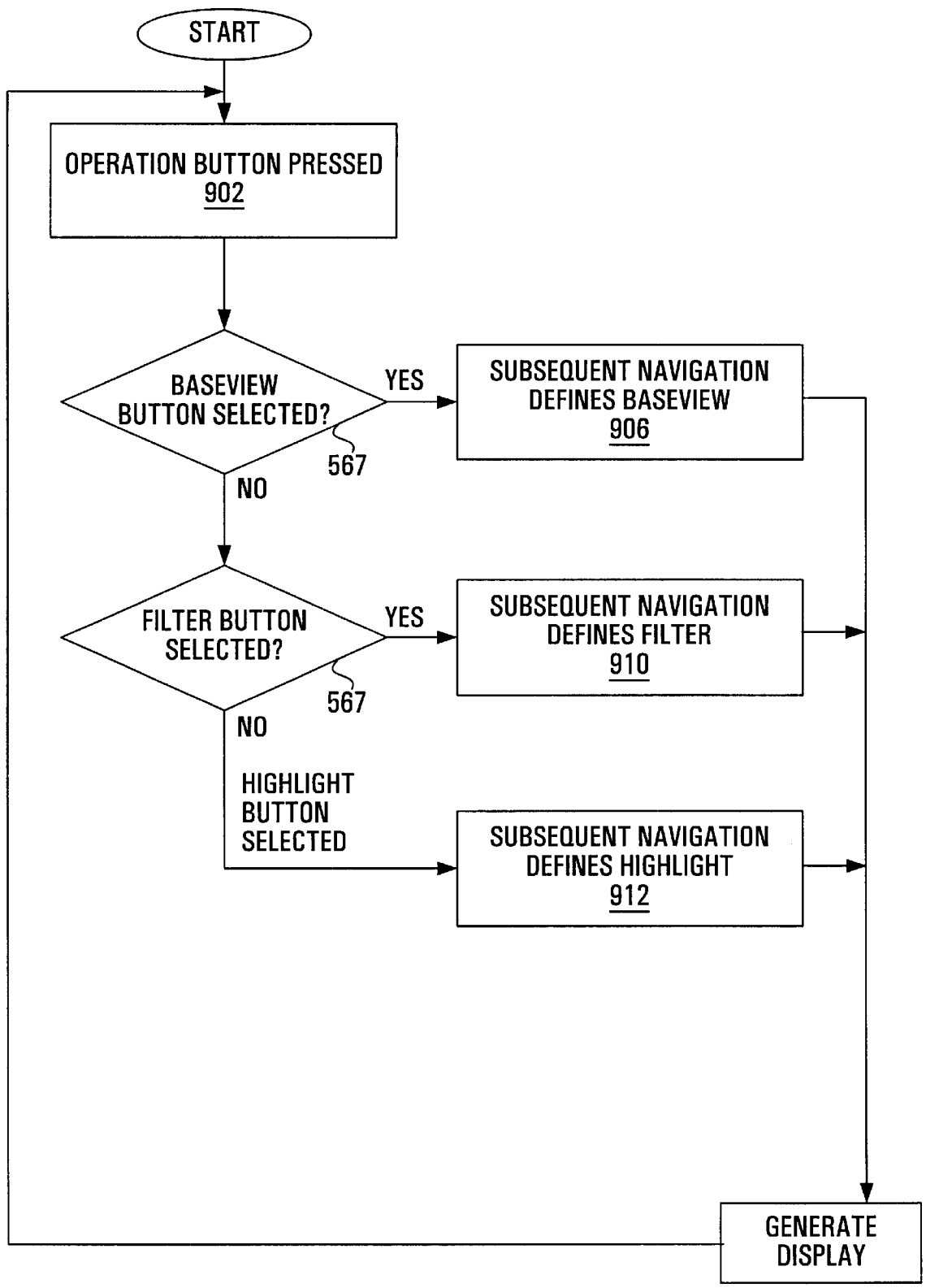
FIGS. 9A, 9B and 9C are flow charts illustrating the steps the GUI of FIG. 1 preferably executes to create and display a layer cake.
Figure 9B:
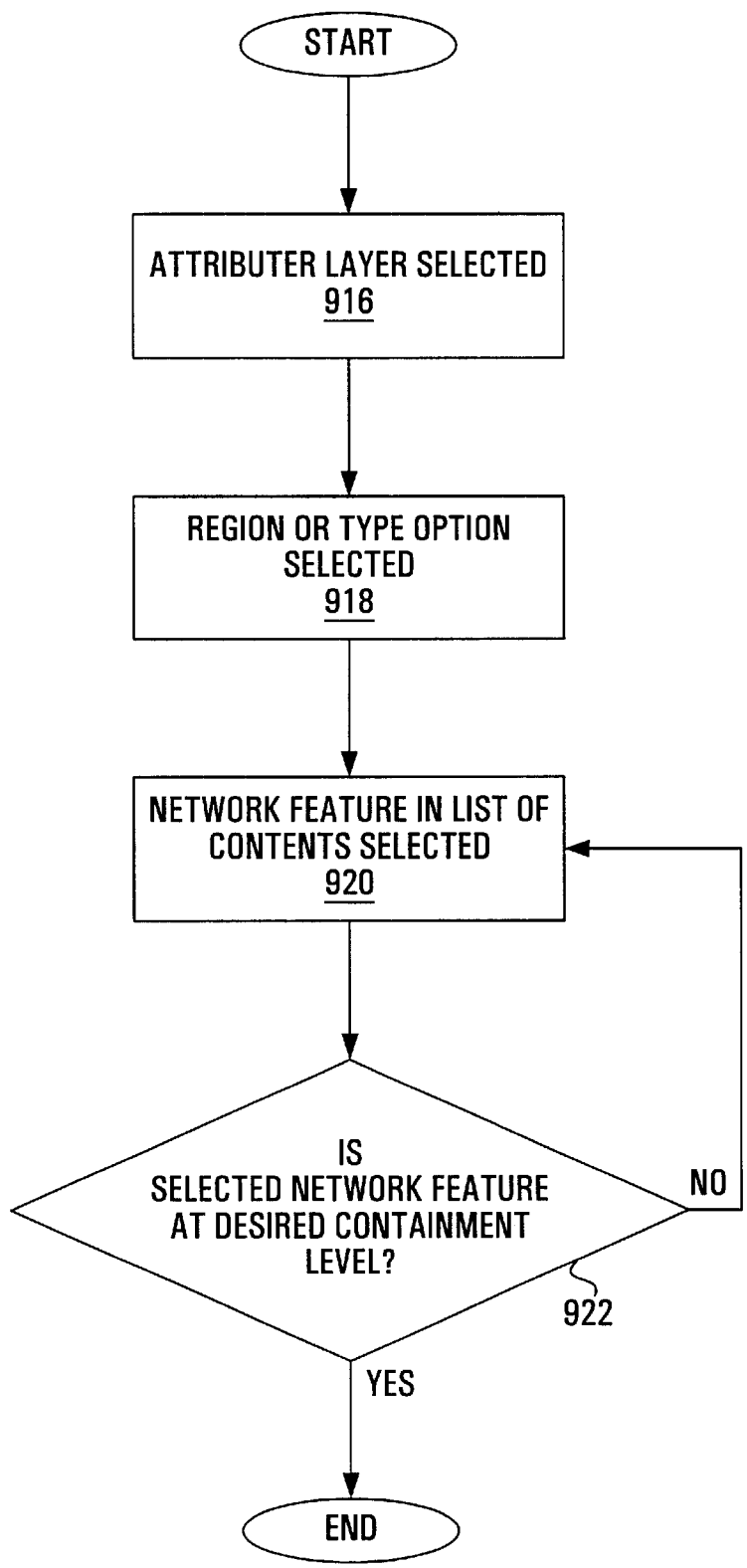
Figure 9C:
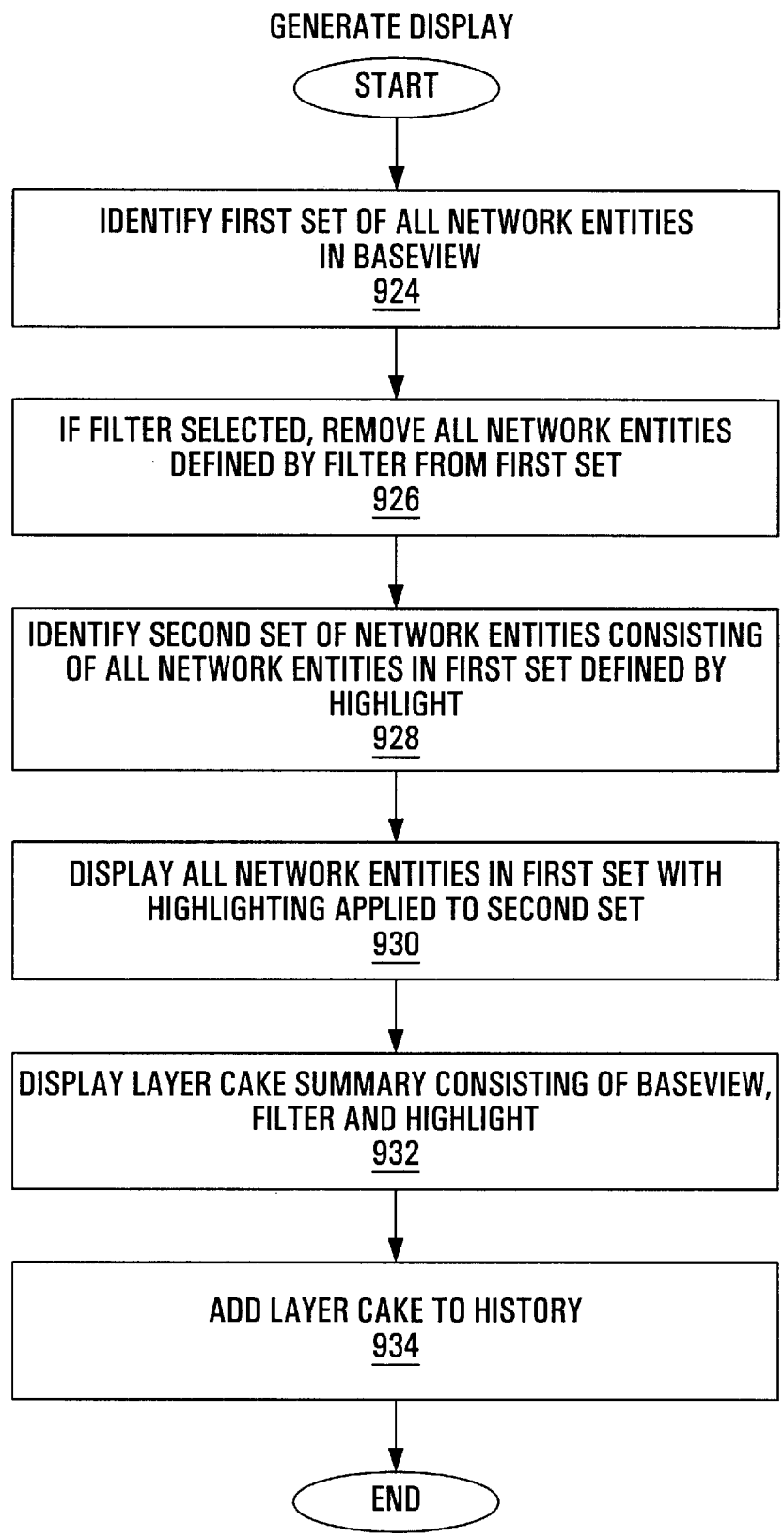

A plurality of steps performed by the GUI 120, according to a preferred embodiment, for creating and displaying a layer cake are now described with reference to FIGS. 9A, 9B and 9C. Along with the descriptions of these steps, the different components comprised within the layer cake selection window 206 used by the user to create the layer cake are also described. FIG. 9A illustrates the overall operation for the navigating through the attribute layers' hierarchies while FIGS. 9B and 9C define further the steps within FIG. 9A as will be described herein below.

Initially, as depicted at step 902 within FIG. 9A, the GUI determines whether the user has pressed an operation button; the operation buttons consisting of the base view button 218, the highlight button 220, and the filter button 222. Only one of these buttons 218,220,222 can be pressed at any one time, the operation mode of the GUI 120 being determined by the pressing of the buttons.

As depicted at step 904, the GUI 120 next determines whether the base view button 218 was selected. If the base view button 218 was selected by the user at step 904, the subsequent navigation within the layer cake selection window 206, at step 906 and as depicted in FIG. 9B, will determine the network feature(s) that define the base view within the network display window 208. In the examples described herein below with reference to FIGS. 2 through 6 the base view is a geographical region network feature, though this should not limit the scope of the present invention.

If the GUI 120 determines that the base view button 222 was not selected at step 904, the GUI determines if the filter button 222 was selected by the user at step 908. If it was selected, the subsequent navigation within the layer cake selection window 206, at step 910 and also depicted in FIG. 9B, indicates that the subsequent network feature(s) that are selected are to be used for a filtering operation. This means that all network entities that are defined with the selected network feature(s) are isolated by the filtering out of some or all of the other network entities.

If the GUI 120 determines that neither the base view nor filter buttons 218,222 were pressed, then the highlight button 220 must have been selected. If the highlight button is selected, the subsequent navigation within the layer cake selection window 206, at step 912 and further depicted in FIG. 9B, indicates network feature(s) that are selected to be used for a highlighting operation. This means that all network entities that are defined with the selected network feature(s) are highlighted or otherwise visually distinguished within the network display window 208. The difference between the operation of the highlight and filter buttons 220,222 is that the highlighting operation does not filter out any network entities currently being shown within the network display window 208, but simply visually distinguishes the network entities defined with the selected network feature(s). Conversely, the filtering operation preferably removes all network entities except those defined with each of the selected network feature(s), the base view, and any other network features selected during previous filtering operations.

After any one of steps 906, 910 or 912, the GUI 120 preferably generates, at step 914, a network display on the network display window 208 as will be described herein below with reference to FIG. 9C. Further, the GUI 120 then waits for the user to press an operation button again at step 902. At this point, additional network features can be added for the filtering and/or highlighting or the base view can be changed. Preferably, a change in the base view results in the other selected network features for filtering and highlighting operations to also be removed.

NAVIGATION WITH THE LAYER CAKE SELECTION WINDOW

The navigation within the layer cake selection window 206 for the selecting of network features during the base view selection, filtering operation, and highlighting operation is now described with reference to FIG. 9B. The first step 916 of the navigation of the layer cake selection window 206 is for the GUI 120 to have the user select an attribute layer that the subsequent network feature to be selected is characterized by. In the illustrated examples described later with reference to FIG. 2 through 6, the attribute layers are network, customer, and service and these are selected with respective attribute layer selection tabs 224,226,228. Of course different attribute layers could alternatively be defined. Preferably, the selection of a particular tab results in a panel for that attribute layer being displayed on top of the tabs for the other attribute layers. In the event that step 916 is not performed by the user, the previous selection is maintained.

Next as shown at step 918, the GUI 120 has the user select either the region or type option 230 for the network feature that is to be subsequently selected. The selection of the region or type option 230 is preferably done by mouse clicking on the circle in front of the words "REGION" or "TYPE" respectively within the layer cake selection window 206. Similar to the selection of the attribute layers, in the event that step 918 is skipped, the previous selection is maintained. The selection of the region option indicates that the network feature that is to be selected will be a geographical region network feature. In preferred embodiments, only a single geographical region is selected for a layer cake such that it is used as the base view, within a filtering operation, or within a highlighting operation. In the examples described herein below with reference to FIGS. 2 through 6, the region option is selected during the base view selection as the network feature selected for the base view is preferably a geographical region network feature.

In other embodiments still within the scope of the present invention, geographical region network features are associated with any one of the other attribute layers (such as the network, customer or service attribute layers) and any one of the base view selection, filtering operations and highlighting operations. In these alternatives, the region and type essentially define two distinct network feature containment hierarchies for each attribute layer. Thus, there is a respective containment hierarchy of network attribute layer network features based on each of type and region, a respective containment hierarchy of customer attribute layer network features based on each of type and region, and a respective containment hierarchy of service attribute layer network features based on each of type and region. In some of these alternative embodiments, the region hierarchy for each of the attribute layers is the same, though in some other embodiments the user can select a different geographical region network feature for the different attribute layers. This could result in a first set of network entities defined by a first network feature being selected due to being in a first geographical region and being defined by the first network feature while a second set of network entities is selected due to being within a second geographical region and being defined by the second network feature. It is noted, that in the above case, the first and second geographical regions could overlap. In a case in which the base view is a geographical region network feature, it could be seen that a customer, service, or network entity type could be highlighted or isolated for a geographical region contained within the base view. The highlighting and/or filtering operations would use the region option to limit the geographical area in which a customer, service, or network entity type are highlighted or filtered.

The selecting of the type option indicates that the network feature that is to be selected will be a "type" of network entity, customer, service or other attribute layer. A "type" is preferably either a specific network entity, customer or service or is a general grouping of network entities, customers, or services.

Referring back to FIG. 9B, the next steps 920,922 comprise the steps in which the GUI 120 must have the user perform selections with the direct containment hierarchy 214 and the list of contents 216 to navigate through a series of containment levels in order to select a specific network feature to be included within the layer cake for either a base view, filter or highlight. The operation of the direct containment hierarchy 214 and the list of contents 216 for a particular attribute layer is preferably as disclosed within U.S. patent application Ser. No. 09/337,536 entitled "Method and Apparatus for Displaying and Navigating Containment Hierarchies" by Rochford et al, filed on June 22, 1999, assigned to the assignee of the present invention, and herein incorporated by reference. Initially, the direct containment hierarchy 214 comprises the top-level network feature associated with the selected attribute layer and region/type option. Within the examples shown with reference to FIGS. 2 through 6, the top-level network feature for a geographical region, a network entity type, a customer type, and a service type is the "WORLD", "ALL NET- WORK ENTITIES", "ALL CUSTOMERS", and "ALL SERVICES" network features respectively. As well, initially the list of contents 216 contains all of the children corresponding to the top-level network feature or the previously selected network feature. To navigate down to a specific network feature of interest, the user can select one of the network features within the list of contents 216 by clicking on the particular network feature as depicted at step 920. This results in the selected network feature being added to the direct containment hierarchy 214 (or alternatively the direct containment hierarchy being redrawn to include the selected network feature) and the children of the newly selected network feature being displayed in place of the list of contents previously displayed for the previously selected network feature. As depicted at step 922, if this selected network feature is not at the desired containment level, the user can proceed back to step 920 and select a child of the previously selected network feature. This will continue until the selected network feature from the list of contents 216 is at the containment level of interest. At this point, the user preferably selects the network feature as a network feature to be added to the layer cake by double clicking with the mouse 116 on the particular network feature. Preferably, in the case that a network feature already has been selected for a particular hierarchy, the previously selected network feature and its corresponding direct containment hierarchy are initially displayed in the direct containment hierarchy 214 rather than the top-level network feature alone.

After the selection of a network feature for inclusion within a layer cake, the second window 217 containing the list of contents 216 preferably disappears from the GUI 120, leaving the first window 215 containing the direct containment hierarchy 214 comprising the selected network feature at the bottom of a list of its parent, grandparent, etc that were added to the hierarchy 214 during the selection process. The direct containment hierarchy 214 preferably only includes the network features which lead directly to the selected network feature. The result is a concise display of the hierarchy of the particular network feature which can be immediately discerned directly from the display without the need to perform any scrolling.

In one embodiment, only a single network feature is selected during a single base view selection, filter operation, or highlight operation. However, more generally, after a network feature for a selected attribute layer has been selected as described above with reference to FIG. 9B, the same process may be repeated for the other attribute layers resulting in either:

1. a base view defined by one or more network features in respective attribute layers if the base view button 218 was selected. Preferably, only a single network feature defines a base view;
2. a filter definition defined by one or more network features in respective attribute layers if the filter button 222 was selected. The filter network features must be associated with, or subsidiary to the network feature(s) selected for the base view; or
3. a highlight definition defined by one or more network features in respective attribute layers if the highlight button 220 was selected. The highlight network features must be associated with, or subsidiary to the network feature(s) selected for the base view.

GENERATING THE DISPLAY

The step of generating the display at step 914 within FIG. 9A is now described in further detail with reference to FIG. 9C. Preferably, the generating a new display within the network display window 208 occurs after each selection of a base view, each selection of a network feature to perform a filtering operation, and each selection of a network feature to perform a highlighting operation. Alternatively, the generating of a new display could be done at any time selected by the user of the GUI 120 such as after all network features to be included within the layer cake (as part of the base view selection, a filtering operation or a highlighting operation) have been selected.

The first step 924 within the procedure of generating a display according to a preferred embodiment is to identify a first set of all network entities within the base view. Next, if network feature(s) were selected for filter operations, the GUI 120 removes all network entities that are not defined by the network feature(s) from the first set as depicted at step 926. Subsequently, as depicted at step 928, the GUI 120 identifies a second set of network entities consisting of all network entities in the first set that are defined by the network features selected during a highlighting operation, if any. At this point, the GUI 120 preferably displays all of the network entities in the first set with highlighting being applied to any network entities within the second set. The GUI 120 then, at step 932, preferably writes the network features selected for the particular layer cake consisting of base view network features, filtering network features, and/or highlighting network features within the layer cake display area 207. In this layer cake display area 207, the network features are preferably identified as being defined for a base view, a filtering operation, or a highlighting operation with use of a symbol to the left of the network features' names, these symbols preferably being the same as those on their respective buttons. In the examples shown, the symbols are a rhombus with an arrow, a sun, and two shapes overlapping for the base view, highlighting operation and the filtering operation respectively.

Next, at step 934, the GUI 120 stores the currently displayed layer cake to a history feature that will be described in detail with reference to FIG. 8. Preferably this storage is done by saving the list of selected network features for the base view, filtering operations, and highlighting operations into the local database 118. Alternatively, this storage either only includes the first and second sets of network entities or the first and second sets along with the list of selected network features. It is noted that for these alternative implementations, a relatively large amount of memory would be required within the local database 118 to store the sets of network entities.

ADDITIONAL DETAIL OF THE LAYER CAKE SELECTION WINDOW

The first and second windows 215,217 are preferably displayed adjacent to each other, or with the second window 217 partially overlapping the first. The display of the second window 217 has an arrow 232 pointing to the network feature in the direct containment hierarchy 214 whose children are listed in the list of contents 216. In a preferred embodiment, the arrow 232 can be dragged or otherwise controlled with a user input device, for example the mouse 116, such that it points to any level in the displayed direct containment hierarchy 214. When such is done, the second window 217 moves up with the arrow 232, and the list of contents 216 is updated to show the children of the network feature pointed to by the arrow 232 at a given time. A sample use of the arrow 232 will be shown during the description of FIGS. 2 through 6 herein below. While an arrow 232 is shown as the mechanism for jumping up to a previously selected level in the direct containment hierarchy 214, it is to be understood that other mechanisms for achieving this may alternatively be employed. For example, by clicking within the direct containment hierarchy 214 with a mouse on the level of interest, by dragging the entire window 217, or any other suitable mechanism.

A further preferable feature of the second window 217 that may be provided is a search window 234 which allows a user to enter a textual search criterion. The system in response to such an entry performs a search of the file names in the currently displayed list of contents and displays any matching results. Any searching technique may be employed to this end including any one of many existing well known techniques.

Yet further, a pictorial representation 236 of the list of contents 216 is preferably provided within the second window 217. Referring to FIG. 2A, in this example, a pictorial representation 236 consisting of a map of the world is depicted with each of the children ("ASIA", "AUSTRALIA", "EUROPE", "NORTH AMERICA", etc.) are shown within the second window 217. In other figures that will be described in more detail herein below, this pictorial representation does not have to be a geographical region, but could alternatively be a logical interpretation of the list of contents 216. For example within FIGS. 3A through 3C, logical views for the customer attribute layer are shown as the pictorial representation. In this case, a small circle within a larger circle is used, the smaller circle containing the parent of the list of contents 216 and the larger circle being divided into slices that represent each of the children within the list of contents 216. For instance, in FIG. 3A, "ALL" is written within the small circle to represent "ALL CUSTOMERS" and "EDUC", "$" "GOV" and a medical symbol are written within the larger circle to represent "EDUCATIONAL", "FINANCIAL", "GOVERNMENT", and "HEALTH CARE" respectively. As a child from the list of contents 216 is selected, the symbol or abbreviation representing the child is written into the small circle with its children surrounding it in the larger circle. Preferably, the pictorial representation is done in a manner which allows the selection of a network feature from the list of contents by clicking on the pictorial representation. For example, within the pictorial representation 236 displayed within FIG. 3A, a user could click on the symbol "$" in order to select the network feature "FINANCIAL". Preferably, it is user selectable to hide the pictorial representation and/or to hide the list of contents. In the illustrated examples of FIGS. 2 through 6, a "hide map" screen switch 238 is provided which when selected redraws the display without the map and shows a screen switch "show map" in place of the "hide map" screen switch. Similarly, a "hide list" screen switch 240 may be provided.

In a preferred embodiment, when a pictorial representation of the selected network feature is displayed as part of the second window 217, different pictorial elements in the pictorial representation will represent the list of contents 216. For example, in FIG. 2A, the list of contents consists of a list of continents, and the pictorial representation 236 is a map of the World illustrating the different continents. Preferably, by "mousing over" the pictorial representation, i.e. by moving a mouse over the pictorial representation but not clicking on anything, the name of the element currently being displayed is brought to the top of the list of contents 216. Preferably, when a particular pictorial element has been moused over, a halo or other highlighting effect is added to the display to make it clear to a user which pictorial element is being moused over at a given time. Preferably, the listing which is brought to the top of the list of contents 236 is highlighted or otherwise distinguished from the remainder of the list.

EXAMPLE UTILIZATIONS FOR THE GUI

The GUI 120 according to a preferred embodiment is now shown by example with reference to FIGS. 2 through 6 during a variety of different operations that create and display a variety of different sets of network entities on the network display window 208. For starters, FIGS. 2A and 2B are illustrating the GUI 120 during the selection of a base view. As depicted in FIG. 2A, the layer cake selection window 206 has the base view button 218 pressed, the network layer tab 224 selected (though preferably any one of the tabs 224,226,228 could be selected with the same result), and the region option within the region/type option 230 selected. This indicates that the base view is being selected as a geographical region representation of a network. Hence, the network feature that is to be added to the layer cake as the base view could be as high-level as the "WORLD" or as low-level as a specified neighbourhood within a city. As shown within FIG. 2A, the "WORLD" is shown as the top-level network feature within the direct containment hierarchy 214 and "ASIA", "AUSTRALIA", "EUROPE", and "NORTH AMERICA" are shown as its children within the list of contents 216. Within FIG. 2A, the network display window 208 and the layer cake display area 207 are both blank since no network features are yet selected for the layer cake within the depicted example.

Figure 2B:
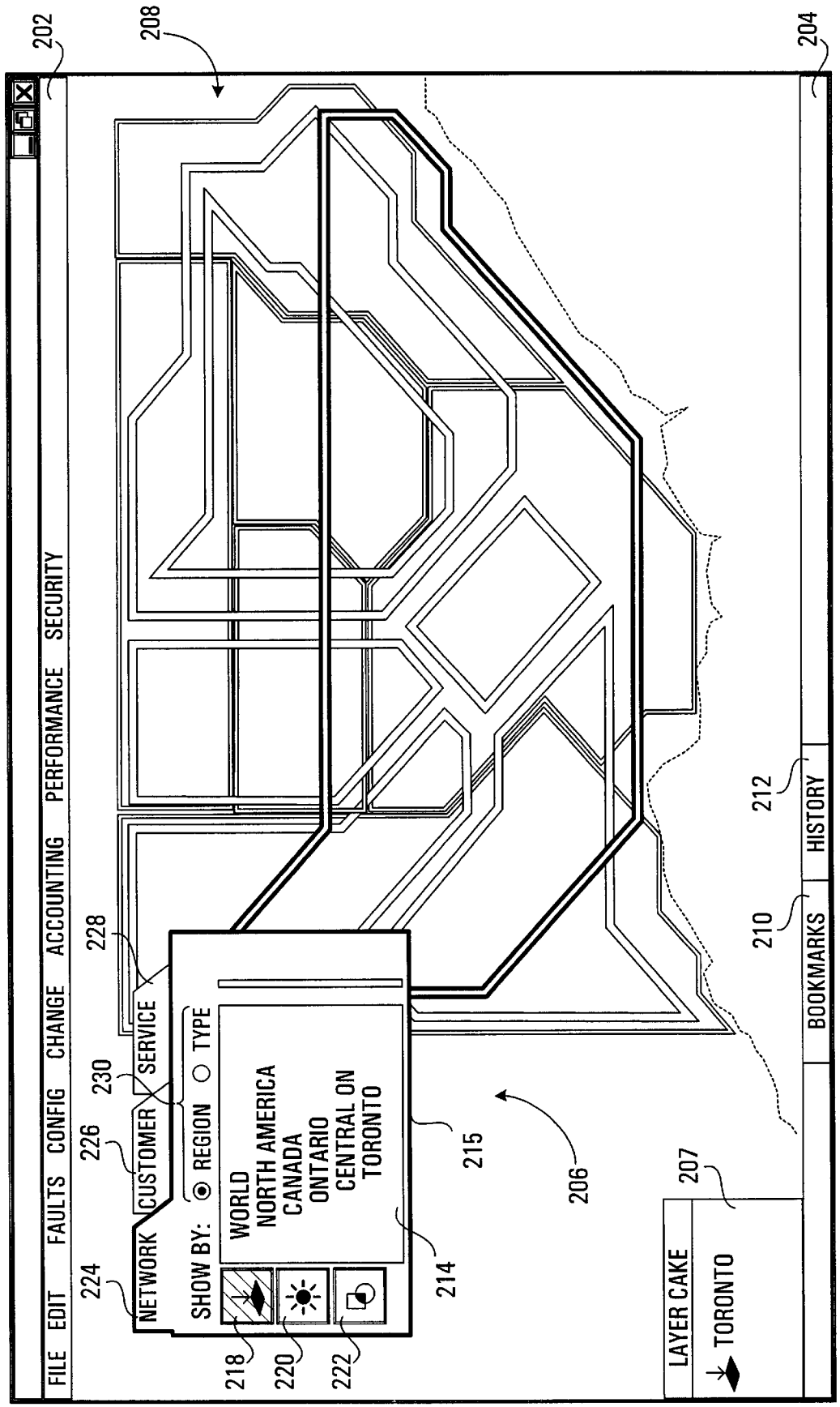

FIG. 2B illustrates the GUI 120 directly after a base view has been selected. In this figure, the geographical region of "TORONTO" has been selected as the base view. The direct containment hierarchy 214 shows that the user selected the network features "NORTH AMERICA", "CANADA", "ONTARIO", and "CENTRAL ON" before finally selecting the "TORONTO" network feature for the base view. It is noted that alternatively, the user could have chosen one of the above network features as the network feature for the base view. Since the user has finished selecting a network feature, as described previously, the window 217 containing the list of contents 216 has disappeared and the geographical region corresponding to the selected network feature ("TORONTO"), in this case a graphical depiction of Toronto, is now being displayed within the network display window 208 and the network feature "TORONTO" is added to the layer cake display area 207. It can be seen on FIG. 2B that the GUI 120 has proceeded through steps 902, 904, 906 (including steps 916 to 922), and 914 (including steps 924 to 934) within FIGS. 9A to 9C to reach this point, though steps 926 and 928 are simplified due to no network features being yet selected for a filtering or highlighting operation.

As shown within FIG. 2B, the base view of "TORONTO" also shows a number of the key network links for the city. In other alternative embodiments no network entities are shown when displaying a geographical region defining the base view. In yet other alternative embodiments, all or a significant portion of the network entities within the base view's geographical region are shown when the base view is shown with no filtering operations performed.

Figure 3A:
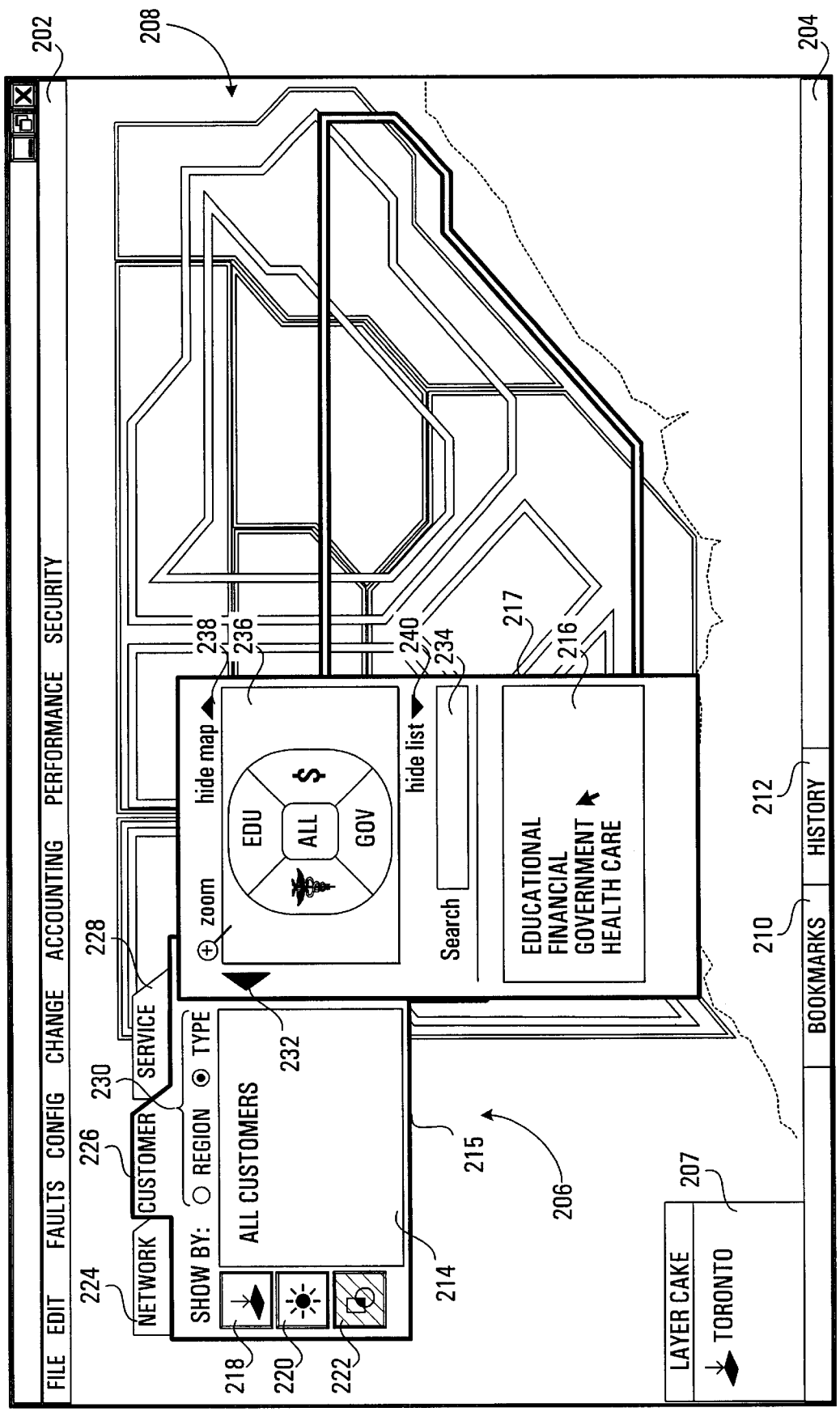
FIGS. 3A through 3D are illustrations of the GUI of FIGS. 2A and 2B during a filtering operation for a customer.

FIGS. 3A through 3D depict the selecting of a network feature for a filtering operation after the base view was previously selected as in FIG. 2B. FIGS. 3A through 3D also show how a user can navigate his/her way through an attribute layer with use of the direct containment hierarchy 214 and the list of contents 216 to select a particular network feature. As depicted within FIG. 3A, the user of the GUI has selected the customer attribute layer tab 226 and the type option within the region/type option 230, and has pressed the filter button 222, which indicates that he/she will select a customer (or a type of customer) for a filtering operation. This selection, as shown in FIG. 3A, results in the "ALL CUSTOMERS" high-level network feature being displayed within the direct containment hierarchy 214 and its children being displayed within the list of contents 216. In this case, the children shown are "EDUCATIONAL", "FINANCIAL", "GOVERNMENT", and "HEALTH CARE". Preferably, as depicted within FIG. 3A and further within FIGS. 3B and 3C, the network display window 208 and the layer cake display area 207 do not change until the network feature to be filtered has been selected. Hence, during the selecting procedure shown in FIGS. 3A through 3C, the network display window 208 and the layer cake display area 207 preferably remain the same as shown in FIG. 2B.

Figure 3B:
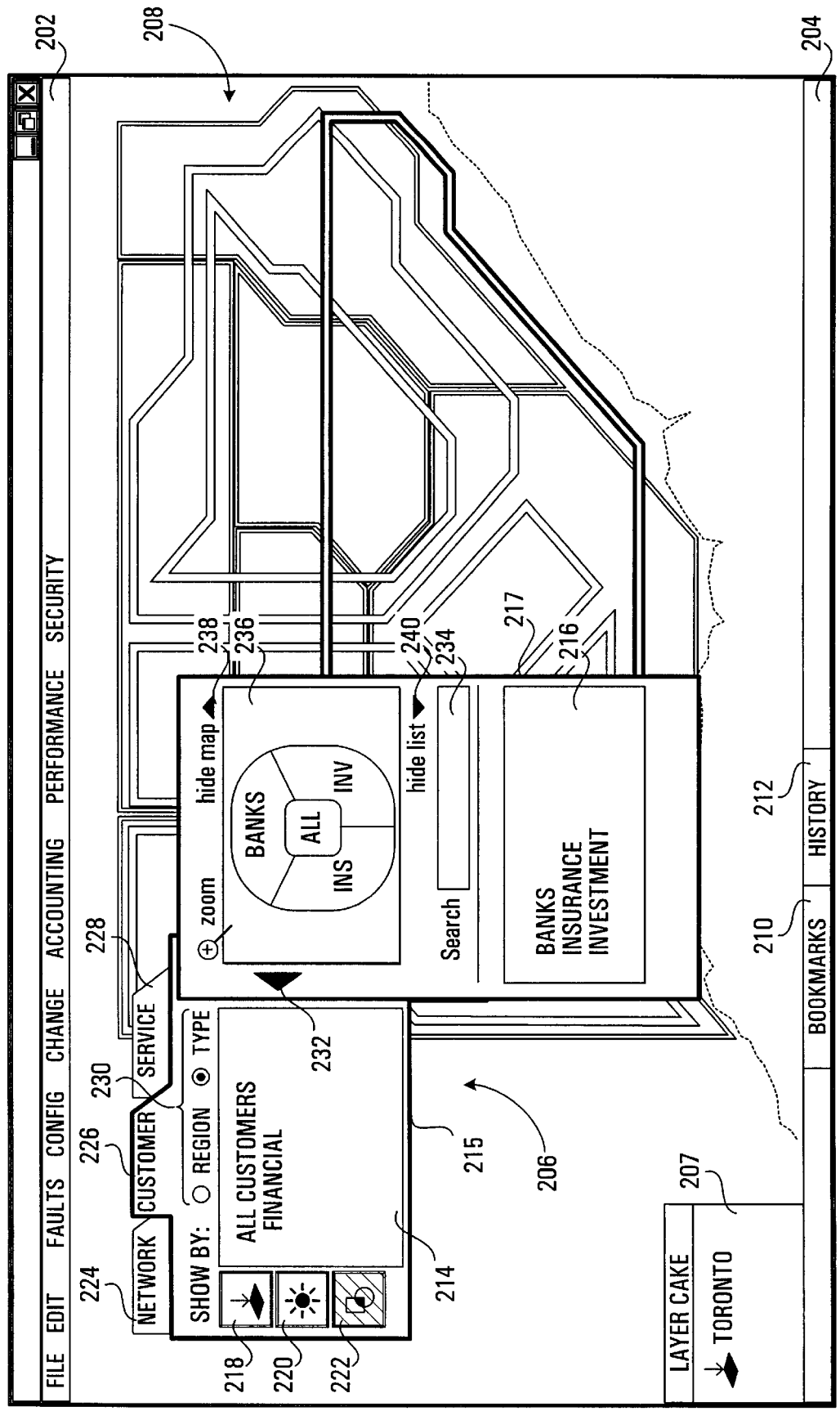

FIG. 3B illustrates the GUI 120 after the user has selected the "FINANCIAL" network feature within the list of contents 216 of FIG. 3A. As a result of this selection, as depicted within FIG. 3B, the word "FINANCIAL" has been added under "ALL CUSTOMERS" within the direct containment hierarchy 214 and the list of contents 216 now contains the children of the network feature "FINANCIAL". For this example, these children include "BANKS", "INSURANCE", and "INVESTMENT".

Figure 3C:
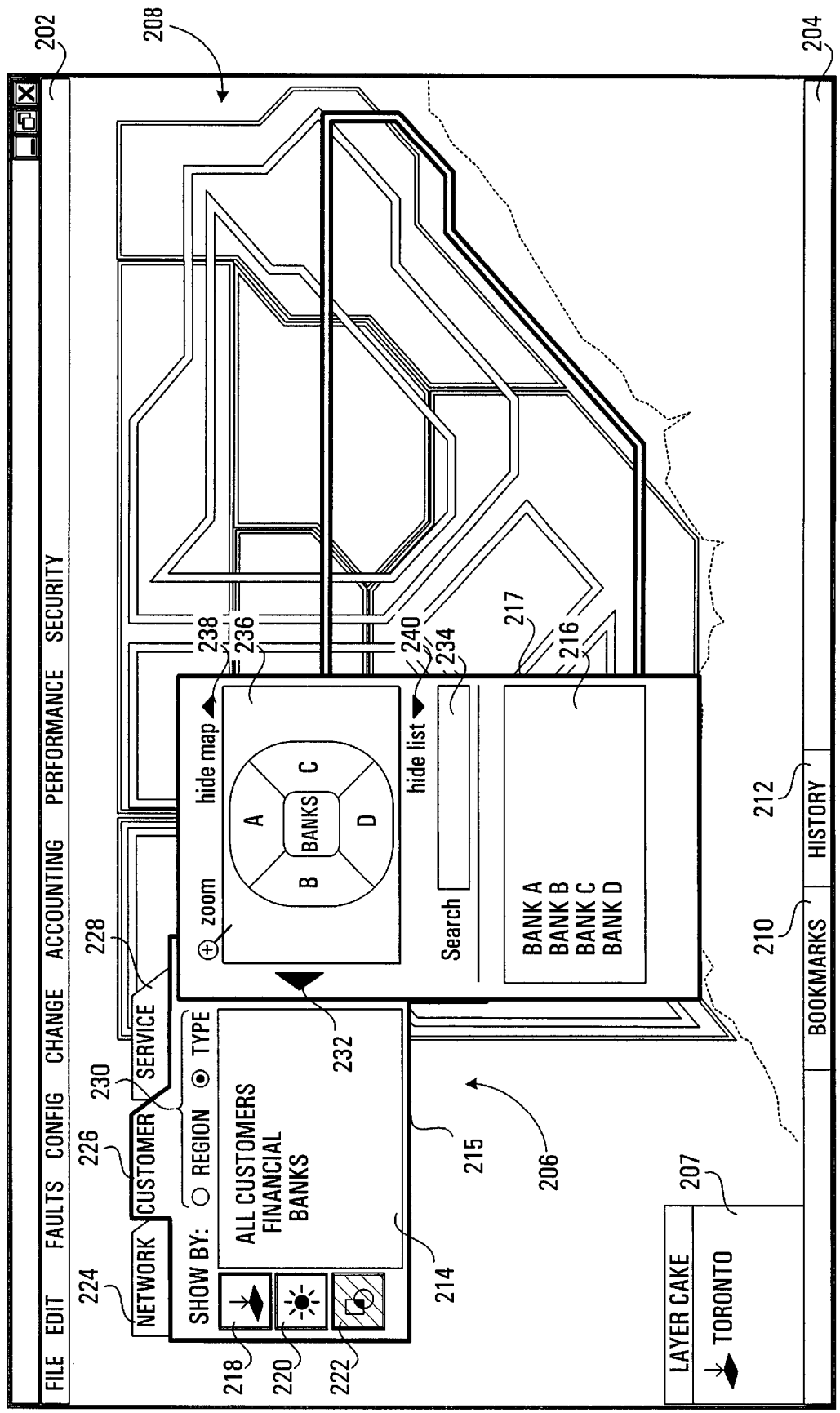

Similar to FIG. 3B, FIG. 3C depicts the GUI 120 after the user has further selected a child within the "FINANCIAL" network feature. In this case, the user has selected "BANKS". This results, in the word "BANKS" being inserted within the direct containment hierarchy 214 under the word "FINANCIAL" and the children within the "BANKS" network feature being displayed within the list of contents 216. As depicted within FIG. 3C, these children include "BANK A", "BANK B", "BANK C", and "BANK D".

Figure 3D:
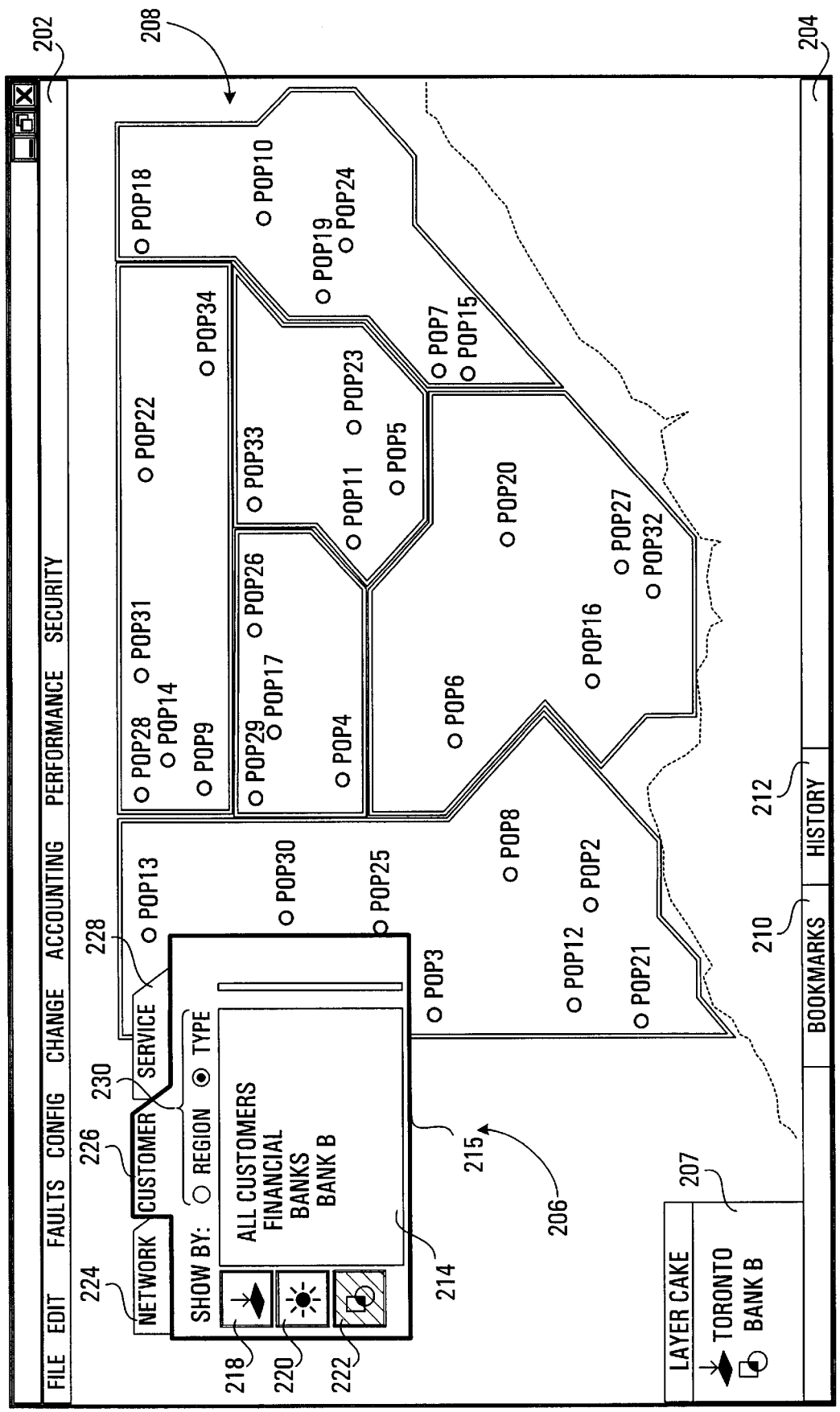

Within the example being presented, the user selects "BANK B" to be the network feature added to the layer cake. This is preferably done with the user double clicking on "BANK B" within the list of contents 216. FIG. 3D illustrates the GUI 120 after the selection of the "BANK B" network feature. At this point, as depicted in FIG. 3D, the words "BANK B" have been added under the word "BANKS" within the direct containment hierarchy 214, the window 217 containing the list of contents 216 has disappeared, Points of Presence (POP) of each of the Bank B institutions within the Toronto region have been added within the network display window 208, and "BANK B" has been written to the layer cake display area 207. In this example, the Points of Presence are located by the processor 110 within the local database 118 as the network entities associated with network feature "BANK B". The fact that the filtering operation was selected by pressing the filter button 222, means that all other network entities not defined by the "BANK B" network feature are not displayed within the network display window 208. Preferably, as shown in FIG. 3D, the Points of Presence are the only network entities associated with the "BANK B" network feature that are displayed, as they are the network entities directly connected to the main carrier network. Interconnections, on the main carrier network, that are associated to particular services associated with the "BANK B" network feature are not displayed in preferable embodiments for clarity. In the example shown within FIG. 3D, even the key network links included within the base view are filtered out, though in some embodiments such a filtering would not take place. It should be understood that the GUI depicted within FIGS. 3A through 3D proceeds through the steps 902, 904, 908, 910 (including steps 914 to 922), and 914 (including steps 924 through 934).

Figure 4A:
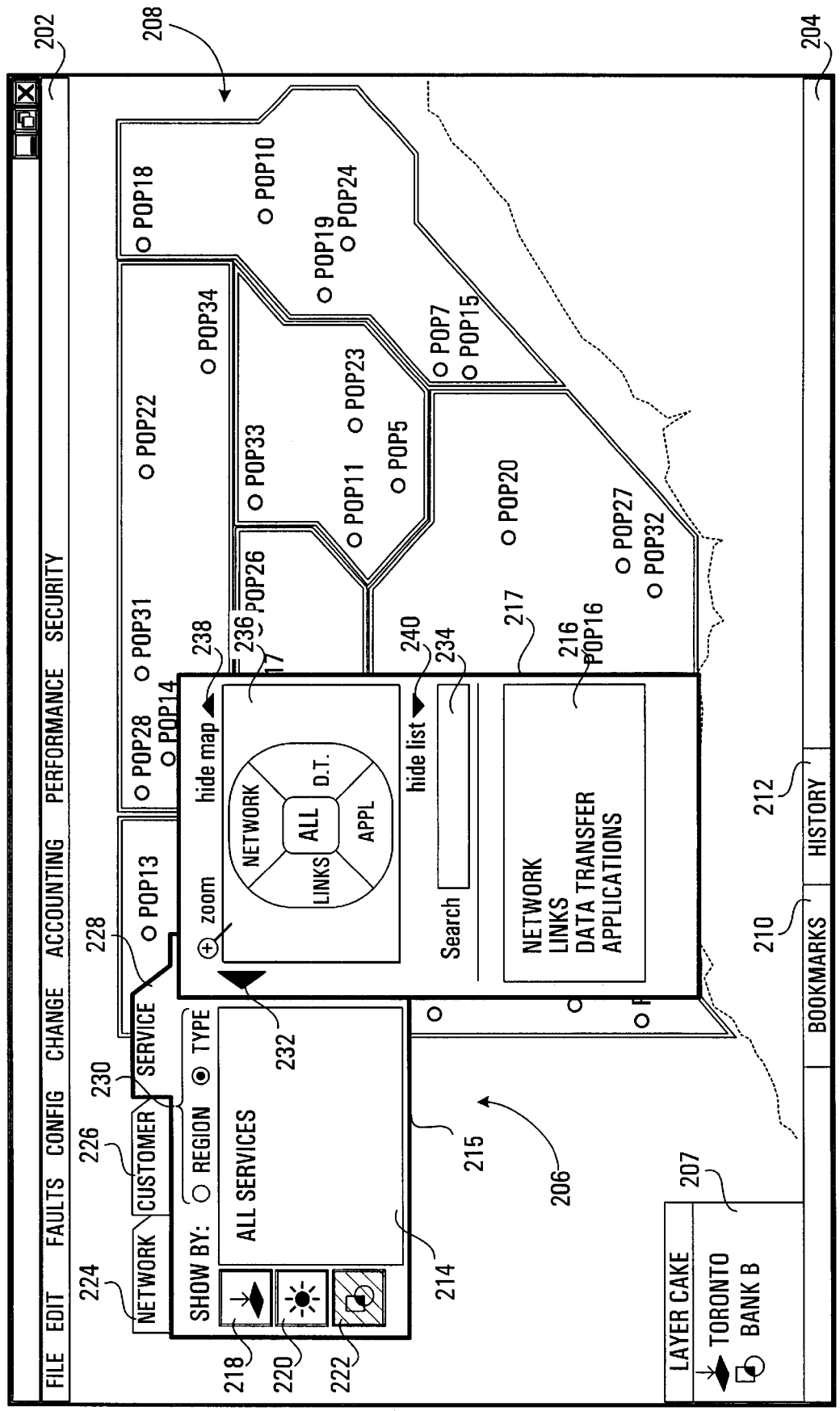
FIGS. 4A and 4B are illustrations of the GUI of FIGS. 2A and 2B during a filtering operation for a service.

The selecting of an additional network feature for filtering within the layer cake generated within FIG. 3D is now described with reference to FIGS. 4A and 4B. This additional selection of a network feature for filtering can be seen as returning to step 902 and proceeding through steps 904, 908 and 910 again. As depicted within FIG. 4A, the user has selected the service attribute layer selection tab 228, has selected the type option of the region/type option 230, and has pressed the filter button 222. This indicates that the user will be selecting a service (or a type of service) for a filtering operation. As depicted within FIG. 4A, the high-level network feature "ALL SERVICES" is written within the direct containment hierarchy 214 while its children such as "NETWORK", "LINKS", "DATA TRANSFER" and "APPLICATIONS" are within the list of contents 216.

Figure 4B:
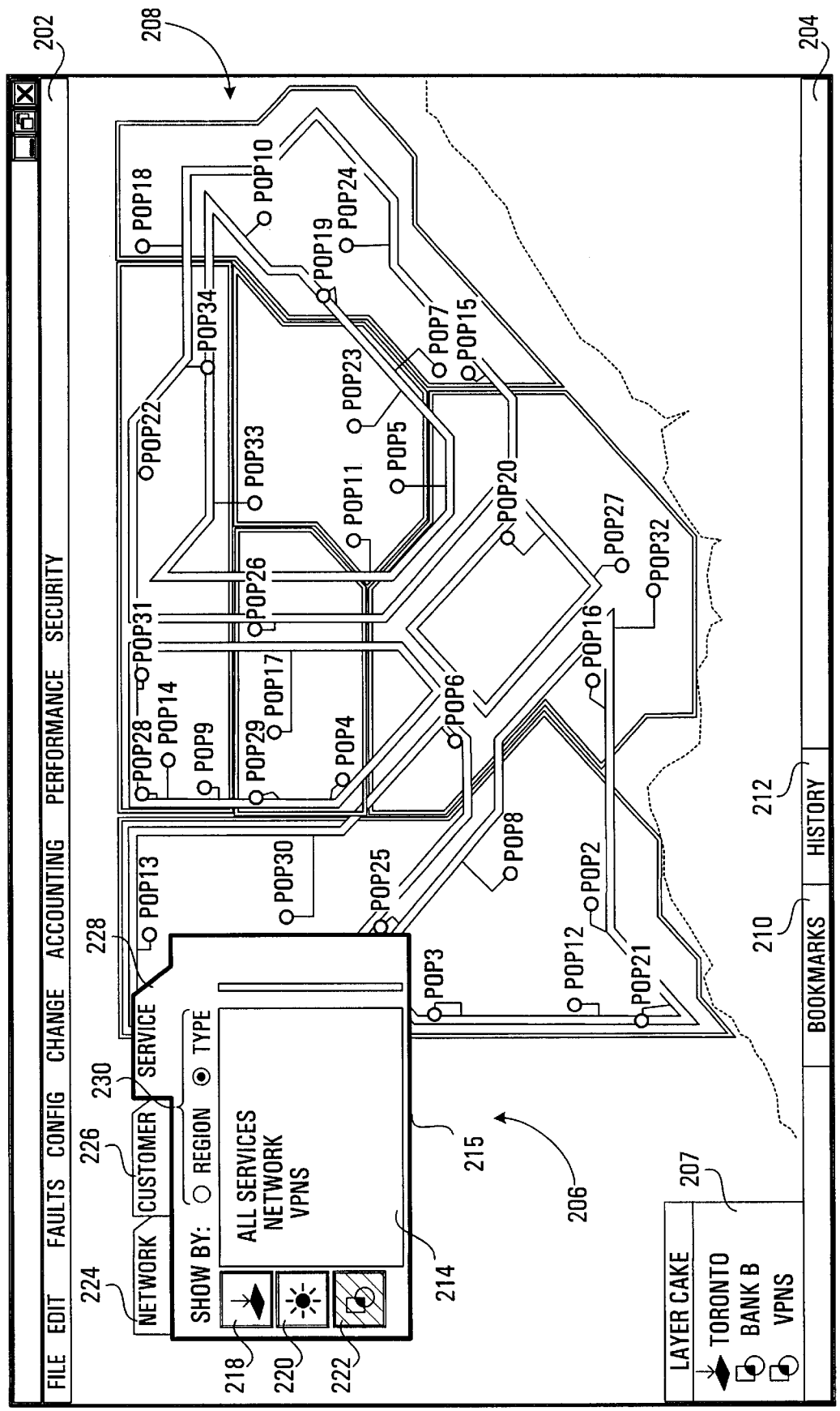

FIG. 4B, shows the GUI 120 after a couple of selections made by the user. Firstly, the user has selected the "NETWORK" network feature from the list of contents 216 of FIG. 4A. Next, the user has selected the "VPNS" child from within the "NETWORK" network feature. By double clicking on the "VPNS" network feature, the user has added it to the layer cake. Now the layer cake is made up of geographical region "TORONTO" (base view), customer "BANK B" (filtering operation) and service "VPNS" (filtering operation). So, the processor 110 now displays the virtual private networks for Bank B in Toronto within the network display window 208 of FIG. 4B and adds the network feature "VPNS" to the layer cake display area 207. All network entities that are associated with other geographical regions, customers, and services are essentially filtered out since these network entities would not be included within the first set at step 926 in FIG. 9C.

Figure 5A:
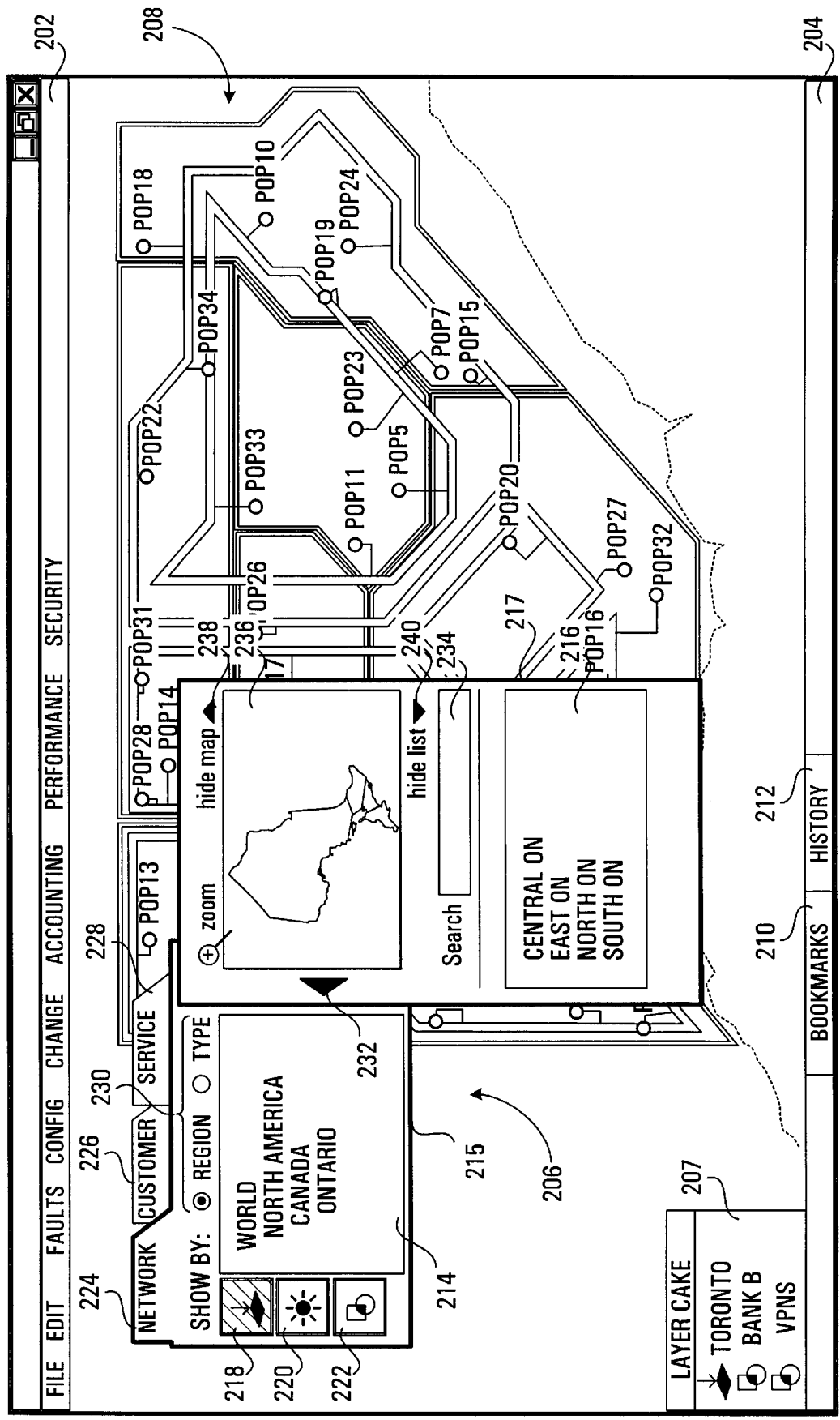
FIGS. 5A through 5C are illustrations of the GUI of FIGS. 2A and 2B during a selection of a new base view and during a filtering operation for a service.

An example is now described with reference to FIGS. 5A through 5C in which the user starts a new layer cake after the creation of the layer cake displayed within FIG. 4B. First, as shown in FIG. 5A, the user has begun the selecting of a new base view. The user has selected the region option within the region/type option 230 and has pressed the base view button 218. These actions result in the display of the network feature selected as the base view for the current layer cake and its hierarchy within the direct containment hierarchy 214. As depicted in FIG. 5A, the user has subsequently moved the arrow 232 to the "ONTARIO" network feature within the direct containment hierarchy 214, resulting in the removal of the network features lower than "ONTARIO" from the direct containment hierarchy 214 and the display of the children of "ONTARIO" within the list of contents 216. In alternative embodiments, the user would select the "ONTARIO" network feature through other methods such as clicking on the word "ONTARIO" within the direct containment hierarchy 216. In this case, "CENTRAL ON", "EAST ON", "NORTH ON", and "SOUTH ON" are displayed within the list of contents 216. As can be seen in FIG. 5A, during the procedure of selecting a new base view (and another layer cake), the network display window 208 and the layer cake display area 207 preferably continues to display the layer cake previously selected.

As depicted within FIG. 5B, the user has subsequently selected "OTTAWA" as the new base view. To do this, the user must have selected "EAST ON" amongst the children of "ONTARIO" before double clicking on "OTTAWA" amongst the children of "EAST ON". At this point, the word "OTTAWA" has been written under the "EAST ON" network feature within the direct containment hierarchy 214, the list of contents 216 has disappeared, the network display window 208 has displayed the geographical region of "OTTAWA", and the layer cake display area 207 has replaced the previous layer cake by listing "OTTAWA" as the base view of the current layer cake. Once again, as seen on FIG. 5B, the base view not only includes the geographical region selected but also preferably includes the key network links within the city. It is noted that the GUI has performed steps 902, 904, 906 (including steps 914 to 922), and step 914 (including steps 924 to 934) to get to this point.

Figure 5B:
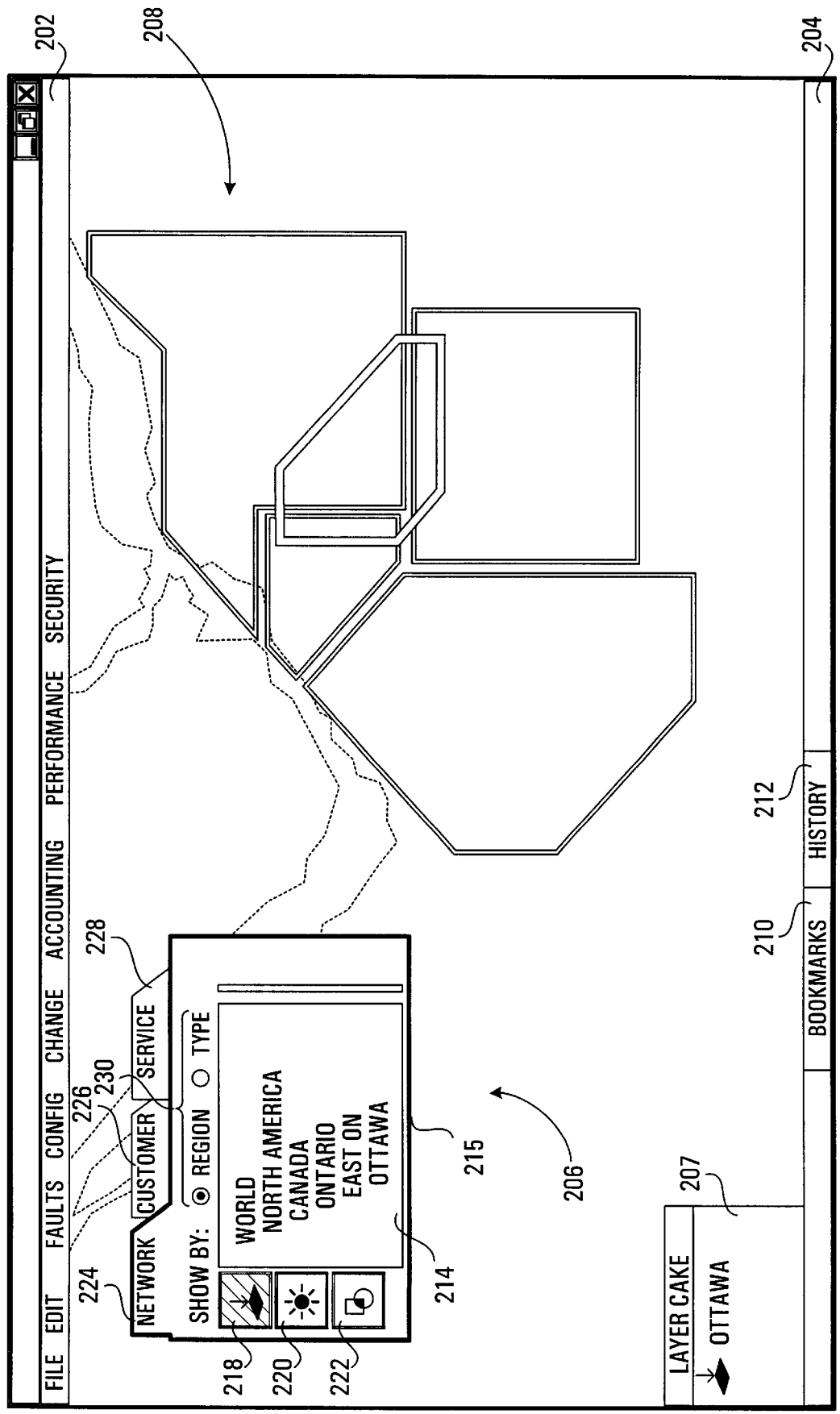

In a preferred embodiment of the present invention as depicted within FIG. 5B, the filtering operations from the layer cake depicted in FIG. 4B, those being customer "BANK B" and service "VPNS", are not transferred with the new base view. This is because, in this preferred embodiment, the initiating of a new base view also initiates the start of a new layer cake. In alternative embodiments, the start of a new base view does not initiate the start of a new layer cake but simply modifies the current layer cake with the new base view. In this case, Ottawa would be shown with the previously defined filtering layers, in this case customer "BANK B" and service "VPNS". In this alternative embodiment, the only time these filtering layers would be changed would be in the case that the user turns them off or changes the selection.

Figure 5C:
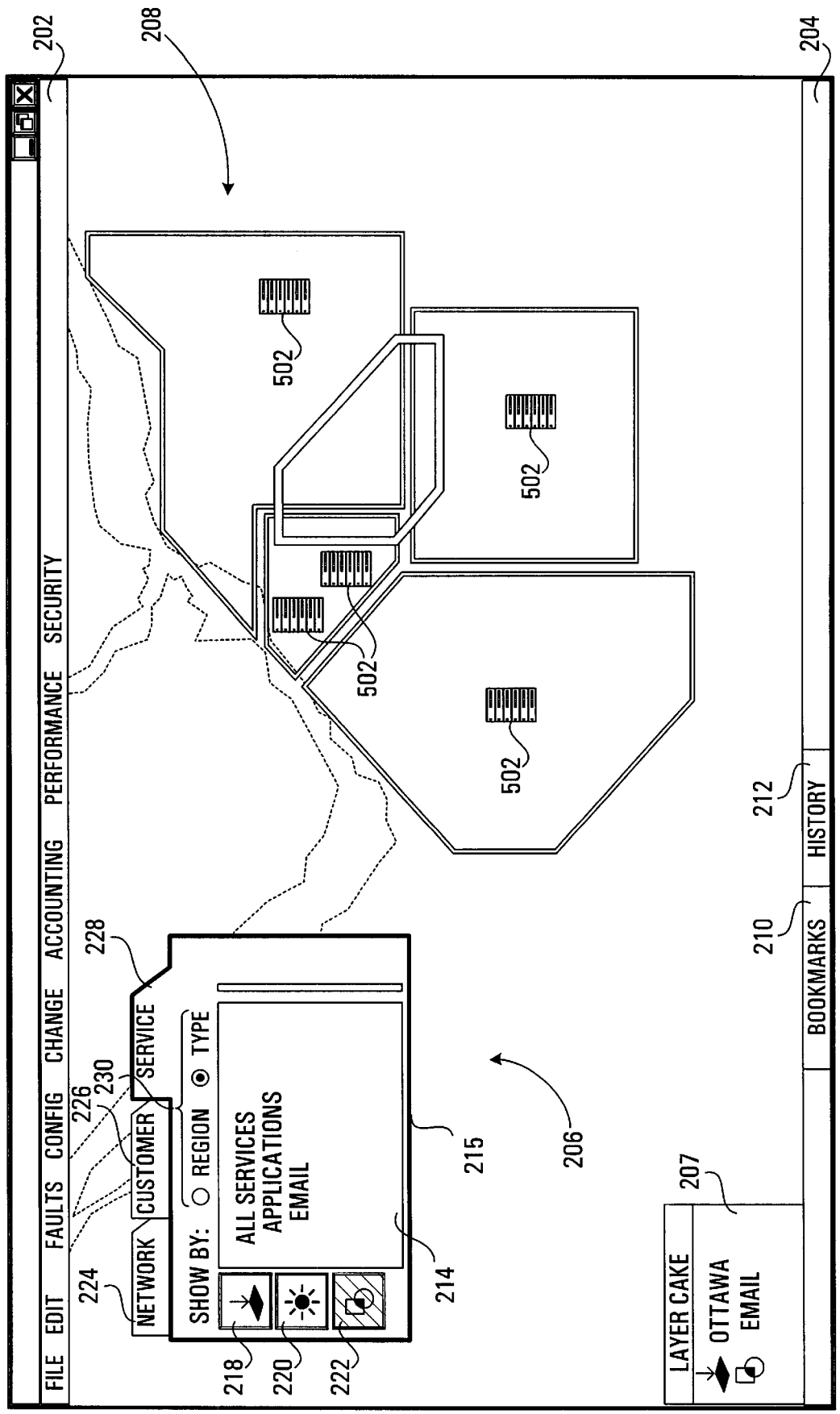

FIG. 5C illustrates the GUI 120 after the user has added a network feature with a filtering operation to the layer cake depicted in FIG. 5B. To get to the point depicted in FIG. 5C, the user has selected the service attribute layer selection tab 228, has selected the type option within the region/type option 230, and has pressed the filter button 222. Then, the user selected the "APPLICATIONS" child within the "ALL SERVICES" high-level network feature and selected for filtering the "EMAIL" network feature within the "APPLICATIONS" parent by double clicking on the "EMAIL" selection. As depicted within the network display window 208 of FIG. 5C, email servers 502 for the Ottawa region are shown within the network display window 208 and the word "EMAIL" has been added to the layer cake display area 207. In this example, unlike the previous example depicted in FIG. 3D, the adding of a network feature to the layer cake with use of a filtering operation did not result in the removal of the key network links for the Ottawa region. This preferably is a user controlled option.

Figure 6A:
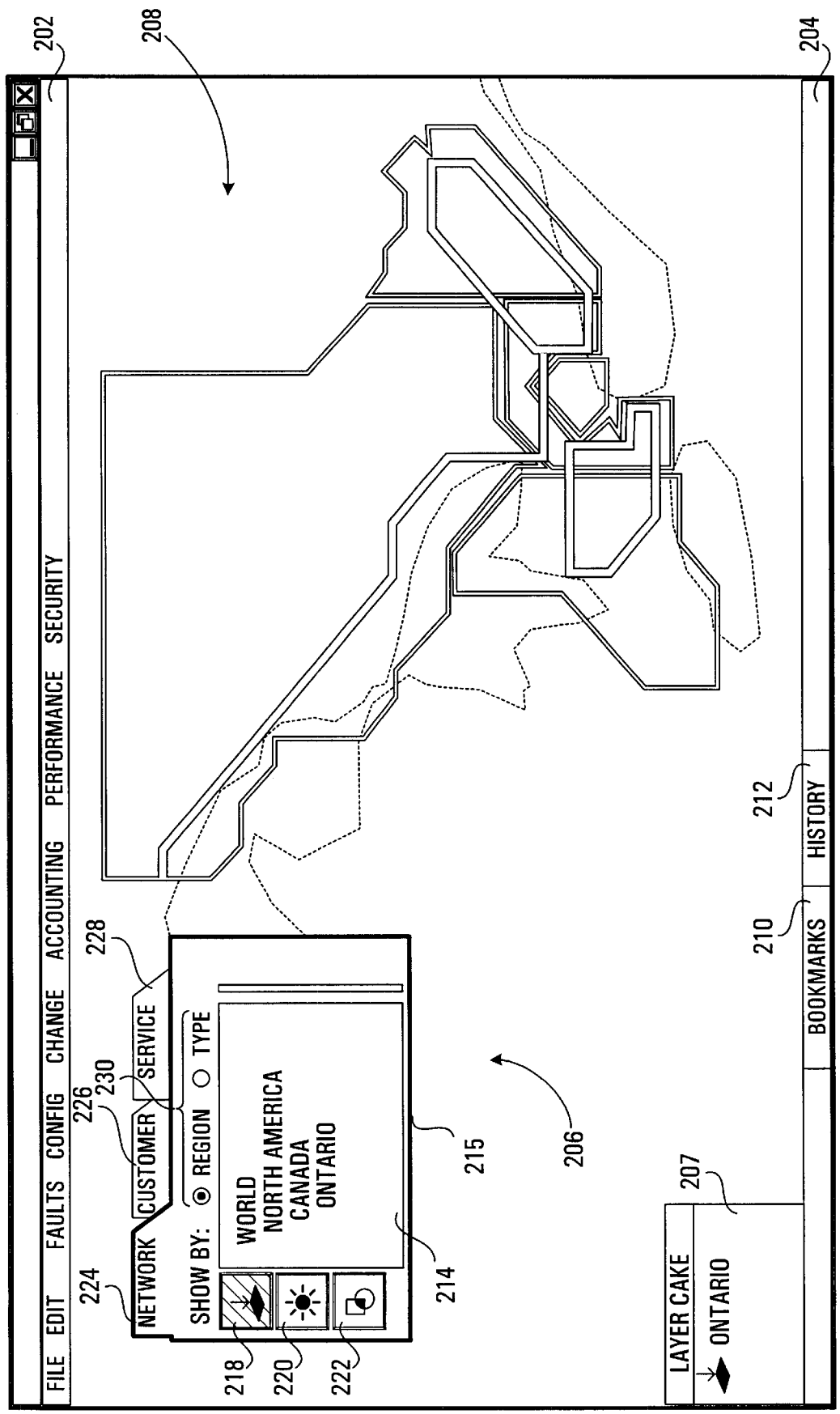
FIGS. 6A through 6C are illustrations of a GUI according to a preferred embodiment of the present invention during a selection of a base view, during a filtering operation, and during a highlighting operation respectively.
Figure 6B:
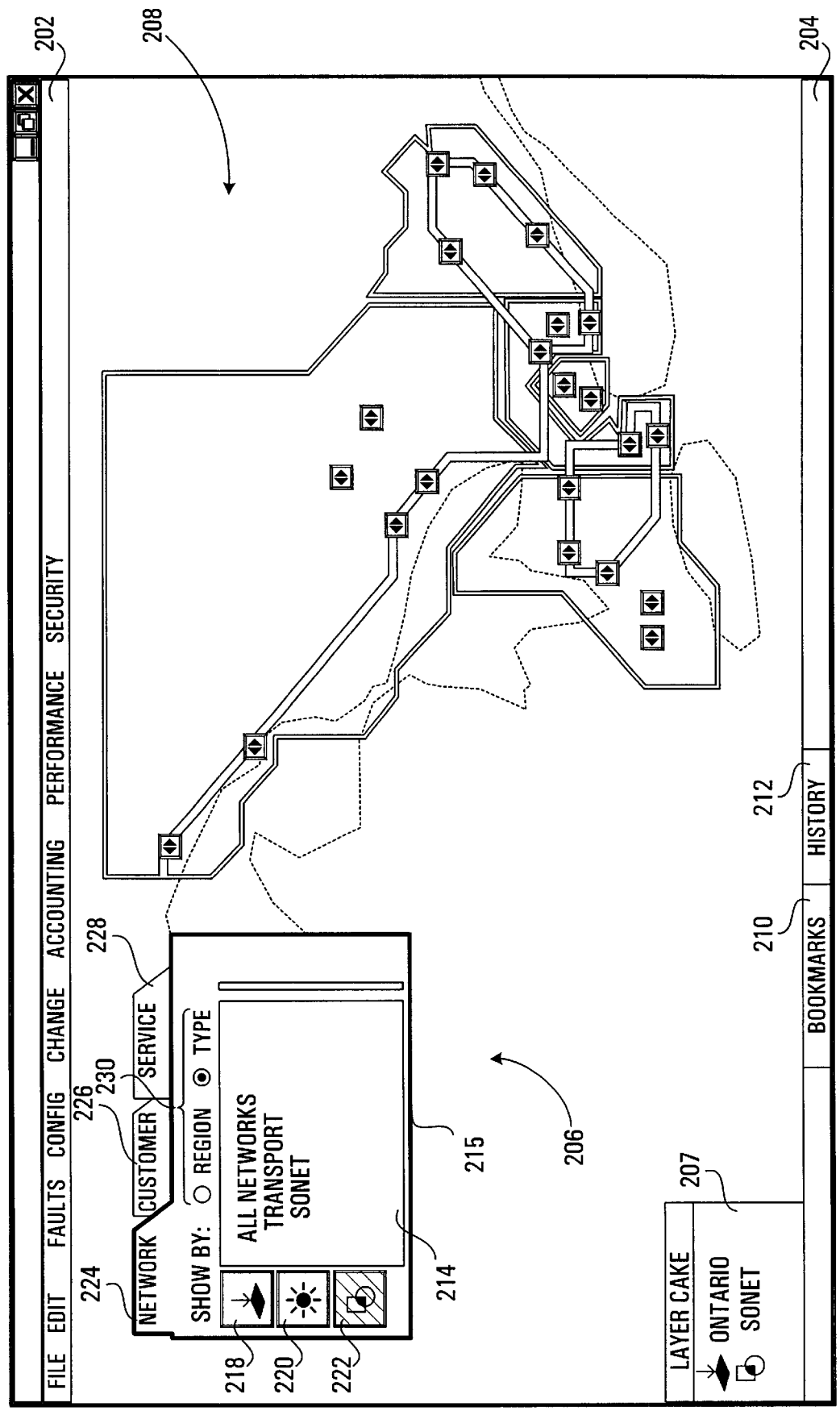
Figure 6C:
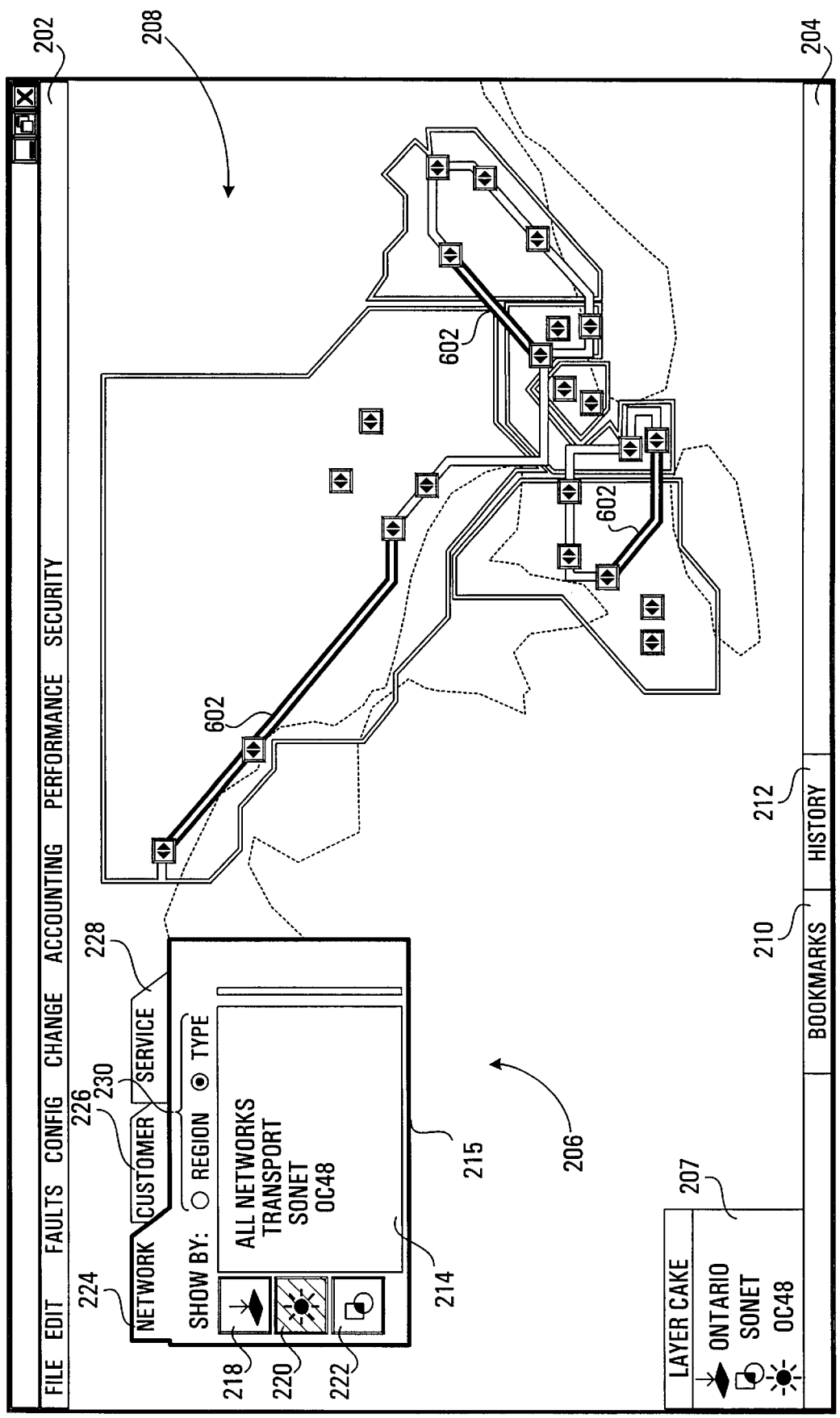

Although the previous examples are specific to layer cakes that have network features added due to filtering operations, highlighting operations can equally add network features to the created layer cake. FIGS. 6A, 6B, and 6C are illustrations of the GUI 120 after the selection of a base view, after a filtering operation for a specific network transport standard, and after a highlighting operation respectively. As depicted in FIG. 6A, the user has selected the geographical region that is defined by the network feature "ONTARIO" as his/her base view. This was done by selecting the region option within the region/type option 230, by pressing the base view button 218, and by navigating to the "ONTARIO" network feature and subsequently double clicking on it. This procedure results in the displaying of an image of Ontario within the network display window 208 and the writing of "ONTARIO" within the layer cake display area 207.

The GUI 120 as depicted in FIG. 6B shows the base view of FIG. 6A with an added network feature within the layer cake due to a filtering operation. In this case, the user has selected the network attribute layer selection tab 224, has selected the type option within the region/type option 230, and has pressed the filter button 222. Subsequently, the user selected the "TRANSPORT" network feature within the "ALL NETWORKS" high-level network feature and double clicked on the "SONET" network feature within the "TRANSPORT" parent. As depicted within FIG. 6B, this procedure results in the displaying of all of the SONET links and servers in Ontario within the network display window 208, with all other transport standards being filtered out, and the word "SONET" being added to the layer cake display area 207.

The GUI 120 as depicted within FIG. 6C illustrates the situation in which the user, subsequent to the filtering of FIG. 6B, proceeds to highlight those SONET links that are connected with OC-48 SONET switches and the interconnections between them. The user does this by pressing the highlight button 220, clicking on the "SONET" network feature within the direct containment hierarchy 214 (resulting in the appearance of the window 217 containing the list of contents 216), and double clicking on the "OC48" network feature within the list of contents (not shown on FIG. 6C). As can be seen in FIG. 6C, all the interconnections 602 between OC-48 SONET switches are highlighted due to this highlighting operation and the word "OC48" is added to the layer cake display area 207. It can be seen that the GUI 120 proceeded through the steps 902, 904, 908, 912 (including steps 914 to 922), and 914 (including steps 924 to 934) to generate the network display shown on FIG. 6C from the layer cake depicted in FIG. 6B.

ADDITIONAL FEATURES OF THE GUI

Figure 7:
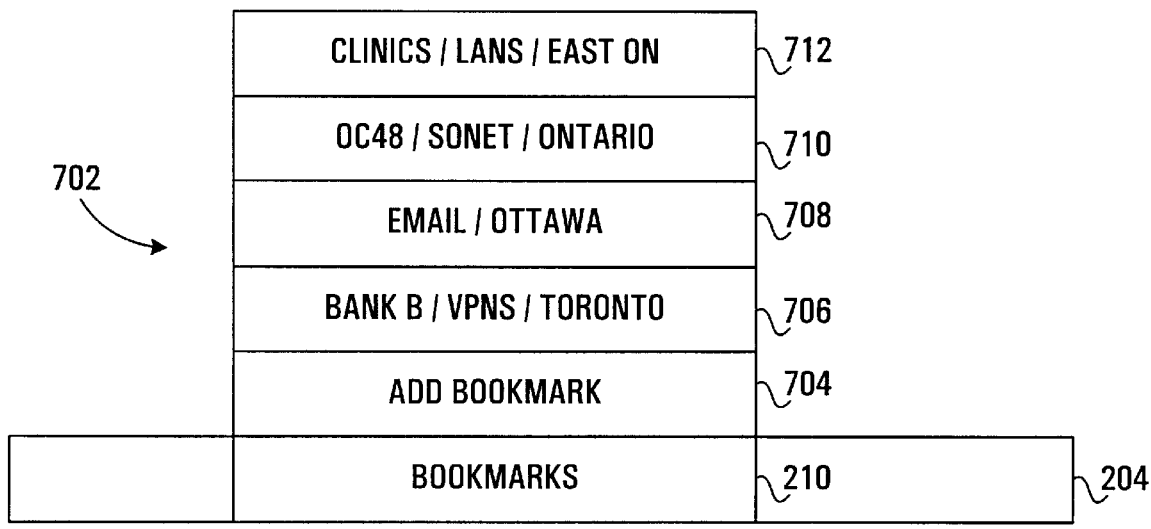
FIG. 7 is an example of a bookmarks option which may be incorporated within the GUI of FIGS. 2A and 2B.

Other features of the GUI 120 according to preferred embodiments that utilize the layer cake format described previously are now described with reference to FIGS. 7 and 8. FIG. 7 illustrates an example use of the bookmarks menu 210 shown within FIGS. 2 through 6 as part of the footer 204. This feature is preferably used by clicking on the bookmarks menu 210 and then making a selection from the options available when a bookmarks window 702 pops up from the bookmarks menu 210. In the example depicted within FIG. 7, the available options within the bookmarks window 702 include "ADD BOOKMARKS" 704, "BANK B/VPNS/TORONTO" 706, "EMAIL/OTTAWA" 708, "SONET/ONTARIO" 710, and "CLINICS/PLANS/EAST ON" 712. The selection of the "ADD BOOKMARKS" option 704 preferably results in the layer cake currently being viewed on the network display window 208 being saved as a bookmark within the local database 118 and added to the bookmarks window 702. The saving of a layer cake preferably comprises saving the selected network features that correspond to the layer cake's base view, filtering operation(s), and highlighting operation(s). Subsequently, if the user selects that bookmark from the list of options within the bookmarks window 702, the exact layer cake that was saved is regenerated by displaying the network entities that correspond to the selected network features on the network display window 208 and listing the corresponding network features on the layer cake display area 207. It should be noted that options 706, 708, and 710 represent the case that the "ADD BOOKMARKS" option 704 was made while FIGS. 4B, 5C, and 6C were being displayed respectively while option 712 represents a bookmarked layer cake that is not described herein above.

Figure 8:
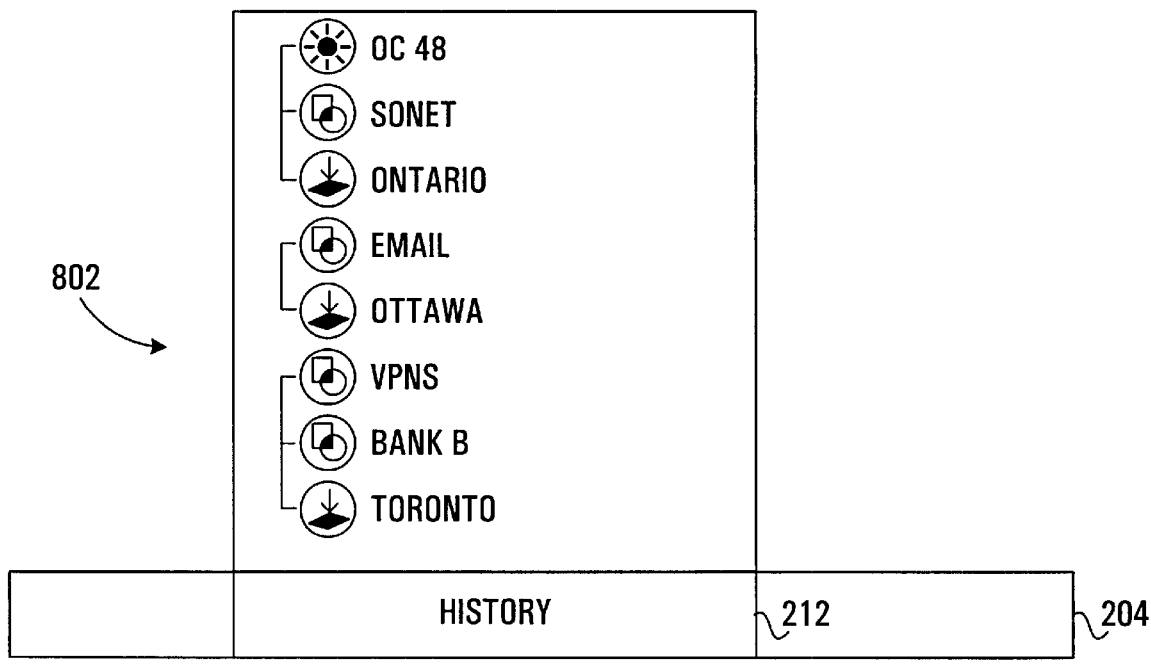
FIG. 8 is an example of a history option which may be incorporated within the GUI of FIGS. 2A and 2B.

FIG. 8 illustrates the use of the history menu 212 that is incorporated within the footer 204 of the GUI 120 depicted in FIGS. 2 through 6. Preferably, once the history menu 212 is selected, by clicking on it, a history window 802 pops up from it. All of the layer cakes (each comprised of one or more network features) that were previously viewed on the network display window 208 are preferably saved within the local database 118, as previously discussed, and displayed within the history window 802. For these layer cakes that were previously viewed, the corresponding network feature (s) are preferably grouped together with a symbol indication given whether the network feature was added as a base view, due to a filtering operation, or due to a highlighting operation. As well, as seen in the preferable history window 802 of FIG. 8, the layer cakes are saved with a dependent hierarchical structure such that a network feature added due to a filtering or highlighting operation may not be viewed without the base view and any other previously added network feature. For example, as depicted within FIG. 8, the attribute "BANK B" is a network feature which can only be selected if the base view "TORONTO" is also chosen. Similarly, network feature "VPNS" can only be selected along with base view "TORONTO" and network feature "BANK B". In alternative embodiments, this linking of network features based upon when they were selected in the history is not performed and so the network features may be selected from the history by themselves. The problem with these alternative embodiments is that, in some circumstances, the historical information loses context without the previously selected filtering, highlighting, and/or base view network features.

Another feature of the GUI 120 according to preferred embodiments is a layer cake monitoring feature. The GUI 120 preferably allows for an entire layer cake to be monitored for errors and/or warnings by monitoring the status signals received at the data collector 106 for each of the network entities within the first set defined at step 928 of FIG. 9C for the particular layer cake. These errors and/or warnings could be associated to such problems as failures and high congestion. For instance, by inserting a layer cake defined by geographical location "TORONTO", customer "BANK B", and service "VPNS" as displayed in FIG. 4B into the monitoring feature, the errors and/or warnings involved with network entities associated with virtual private networks belonging to Bank B within Toronto can be counted and presented to the network manager at regular intervals. This feature is particularly useful if a particular geographical region, customer, service, and/or network entity type is having difficulty.

Although the GUI 120 described herein above has a network display window 208 that displays a geographical network representation of the network, this is not meant to limit the scope of the present invention. For instance, other embodiments of the present invention have windows which display either a logical view or a text view of the selected layer cake. A logical view may consist of network entities such as nodes and links being placed in a systematic order that represents the actual physical network. A text view may consist of a list of network entities that would have been displayed for the selected layer cake had the geographical representation as shown herein above been utilized. These logical and text views of the network are particularly useful when considering network entities that are physically disperse and must be used if no geographical region is selected as one of the network features of the layer cake.

In the above examples, only a single customer, service, or type of network entity were selected for isolation. Preferably, the user of the GUI 120 can further isolate two or more network features from the same attribute layer at the same time, for example two or more customers, services, or types of network entities. This would be done by filtering out all the network entities but those associated with the specified plurality of network features from the same attribute layer. The advantages of allowing multiple network features from the same attribute layer to be isolated together is especially apparent when the network features, such as customers, require similar management. Further, this is useful when the network manager wants to determine if two (or more) services use the same network resources.

Although the preferred embodiments described herein above are directed to the GUI 120 that allows for both the selection of network feature(s) for filtering and the selection of network feature(s) for highlighting, this is not meant to limit the scope of the present invention. Alternative embodiments of the GUI of the present invention perform only one of these operations. Further, as described previously some alternative embodiments do not utilize a base view, but simply use additional filtering operations that are equivalent to the selection of the base view.

There are a number of key advantages of the GUI 120 according to preferred embodiments of the present invention. One key advantage is that such a GUI allows a user to view and manage a complex network by isolating the information relevant to the user at a particular moment. The dividing of the network into a plurality of attribute layers such as services, customers, network entities, and geographical locations, enables the network manager to decide what to view, what to hide from view, and what to highlight. The further preferable features of the bookmarks option, history options, and monitoring feature uses the advantages of the layer cake structure to make the network manager's job more efficient.

The above described embodiments have focused mainly on a method in a computer system for displaying a selected layer cake. In addition, an embodiment of the invention also provides for a software program containing software which when run will implement one or more of the above discussed methods, stored on a computer readable medium. Another embodiment of the invention provides a computer system per se adapted to implement one or more of the above discussed methods. Furthermore, in another embodiment, a graphical user interface is provided which has been adapted to implement one or more of the above discussed methods. Furthermore, in another embodiment, an operating system is provided which has been adapted to implement one or more of the above discussed methods, the operating system preferably being a Windows-based operating system.

Further, an embodiment of the present invention is directed to an apparatus that consists of a memory, a GUI, a processor, and preferably a display. The memory stores a plurality of containment hierarchies of network features; the GUI selects network features within each of the containment hierarchies as focused network features; and the processor identifies network entities categorized by all of the focused network features. Preferably, the display is also included within the apparatus and displays the network entities categorized by all of the focused network features.

Yet further, the present invention of another embodiment is a GUI that is arranged to have access to categorization information with regard to a plurality of network entities within a network. The categorization information for each of the plurality of network entities is a plurality of network features arranged within attribute layers; each attribute layer being defined by a respective containment hierarchy of network features. This GUI operates to receive as focused network features a selection of at least one respective selected network feature for each of at least one of the attribute layers. And, the GUI is arranged to output the focused network features to an apparatus that operates to identify as a focused subset the network entities categorized with all of the focused network features.

Even further, an embodiment of the present invention is an apparatus controlled by control logic where the control logic operates to perform three operations. First, it operates to provide a categorization of each of a plurality of network entities according to a plurality of network features arranged within attribute layers, each attribute layer being defined by a respective containment hierarchy of network features. As well, it operates to receive as focused network features a selection of at least one respective selected network feature for each of at least one of the attribute layers. And further, the control logic operates to identify as said focused subset the network entities categorized with all of the focused network features.

The displaying of network entities on the network display window 208 is described throughout this document. One skilled in the art would understand that this indicates that a symbolic, logical, or textual representation of the network entity is being shown and not necessarily an accurate depiction of the physical apparatus.

Persons skilled in the art will appreciate that there are yet more alternative implementations and modifications possible, and that the above implementation is only an illustration of this embodiment of the invention. The scope of the invention, therefore, is only to be limited by the claims appended hereto.

What is claimed is:

1. Within a Graphical User Interface (GUI), a method for electing a focused subset of a plurality of network entities comprising:

providing a categorization of each of the plurality of network entities according to a plurality of network features arranged within attribute layers, each attribute layer being defined by a respective containment hierarchy of network features;

receiving as focused network features a selection of at least one respective selected network feature for each of at least one of the attribute layers; and identifying as said focused subset the network entities categorized with all of the focused network features.

2. A method according to claim 1 further comprising providing a selection mechanism for selecting between selecting any of said network features as a base view network feature, a filter network feature, and a highlight network feature.

3. A method according to claim 2, wherein at least one of the focused network features is selected as a base view network feature; and wherein the method further comprises identifying as a base view subset the network entities categorized with all of the base view network features.

4. A method according to claim 3, wherein at least one of the focused network features is selected as a filter network feature; and wherein the identifying said focused subset comprises identifying the network entities within the base view subset categorized with all of the filter network features.

5. A method according to claim 4, wherein if any of the base view network feature(s) are changed, the GUI is operable to require reselection of the filter network feature(s).

6. A method according to claim 4, wherein if any of the base view network feature(s) are changed, the GUI is operable to not require reselection of the filter network feature(s).

7. A method according to claim 4 further comprising displaying representations of the network entities of the focused subset.

8. A method according to claim 4 further comprising receiving as highlight network features a selection of at least one respective selected network feature for each of at least one of the attribute layers; and identifying as a highlight subset the network entities within the focused subset categorized with all of the highlight network features.

9. A method according to claim 8 further comprising displaying representations of the network entities of the focused subset and visually distinguishing the representations of the network entities within the highlight subset when displaying the representations of the network entities within the focused subset.

10. A method according to claim 3, wherein at least one of the focused network features is selected as a filter network feature; and wherein the identifying said focused subset comprises identifying the network entities within the base view subset categorized with any of the filter network features.

11. A method according to claim 3 further comprising receiving as highlight network features a selection of at least one respective selected network feature for each of at least one of the attribute layers; and identifying as a highlight subset the network entities within the focused subset categorized with all of the highlight network features.

12. A method according to claim 3, wherein one of the base view network features corresponds to a geographical region.

13. A method according to claim 1 further comprising displaying representations of the network entities within the focused subset.

14. A method according to claim 13, wherein the displaying representations of the network entities within the focused subset is done by producing a geographical view of the representations of the network entities within the focused subset.

15. A method according to claim 13, wherein the displaying representations of the network entities within the focused subset is done by producing a logical view of the representations of the network entities within the focused subset.

16. A method according to claim 13, wherein the displaying the network entities of the focused subset is done by producing a text list of the network entities within the focused subset.

17. A method according to claim 1 further comprising providing a selection mechanism for selecting each focused network feature to define one of a type or a geographical region within one of the attribute layers.

18. A method according to claim 1, wherein one of the attribute layers is defined by a containment hierarchy of geographical region network features.

19. A method according to claim 1, wherein one of the attribute layers is defined by a containment hierarchy of network features concerning types of services and specific services.

20. A method according to claim 1, wherein one of the attribute layers is defined by a containment hierarchy of network features concerning types of customers and specific customers.

21. A method according to claim 1, wherein one of the attribute layers is defined by a containment hierarchy of network features concerning types of network entities.

22. A method according to claim 1 further comprising saving the focused network features as a bookmark for reselection at a later time.

23. A method according to claim 1 further comprising saving the focused network features automatically as a history entry which can be reselected at a later time.

24. A method according to claim 1 further comprising monitoring network information pertaining to the network entities within the focused subset and reporting this information.

25. A method according to claim 24, wherein the reporting the network information comprises counting the number of errors or warnings corresponding to the network entities within the focused subset.

26. A method according to claim 25, wherein the reporting the network information further comprises reporting periodically the number of errors or warnings corresponding to the network entities within the focused subset.

27. A computer system adapted to implement the method of claim 1.

28. A Graphical User Interface (GUI) adapted to implement the method of claim 1.

29. A computer readable medium having software stored thereon for instructing a computer to implement a method according to claim 1.

30. A Graphical User Interface (GUI) that is arranged to have access to categorization information with regard to a plurality of network entities within a network, the categorization information for each of the plurality of network entities being a plurality of network features arranged within attribute layers, each attribute layer being defined by a respective containment hierarchy of network features;

wherein the GUI operates to receive as focused network features a selection of at least one respective selected network feature for each of at least one of the attribute layers; and wherein the GUI is arranged to output the focused network features to an apparatus that operates to identify as a focused subset the network entities categorized with all of the focused network features.

31. An apparatus being controlled by control logic, the control logic operating to:

provide a categorization of each of a plurality of network entities according to a plurality of network features arranged within attribute layers, each attribute layer being is defined by a respective containment hierarchy of network features;

receive as focused network features a selection of at least one respective selected network feature for each of at least one of the attribute layers; and identify as said focused subset the network entities categorized with all of the focused network features.

32. An apparatus according to claim 31, wherein the control logic further operates to provide a selection mechanism for selecting between selecting a base view network feature, a filter network feature, and a highlight network feature.

33. An apparatus according to claim 32, wherein at least one of the focused network features is selected as a base view network feature; and wherein the control logic further operates to identify as a base view subset the network entities categorized with all of the base view network features.

34. An apparatus according to claim 33, wherein at least one of the focused network features is selected as a filter network feature; and wherein the control logic operates to identify said focused subset by identifying the network entities within the base view subset categorized with all of the filter network features.

35. An apparatus according to claim 34, wherein the control logic further operates to display representations of the network entities of the focused subset.

36. An apparatus according to claim 34, wherein the control logic further operates to receive as highlight network features a selection of at least one respective selected network feature for each of at least one of the attribute layers; and identify as a highlight subset the network entities within the focused subset categorized with all of the highlight network features.

37. An apparatus according to claim 36, wherein the control logic further operates to display representations of the network entities of the focused subset and visually distinguish the representations of the network entities within the highlight subset when displaying the representations of the network entities within the focused subset.

* * * * *